(12) United States Patent  
McDonald

(10) Patent No.: US 6,554,078 B1
(45) Date of Patent: Apr. 29, 2003

(54) MULTI-FUNCTION FARM IMPLEMENT FOR TREATING SOIL

(76) Inventor: Kevin G. McDonald, 1340 Lone Palm Ave., Modesto, CA (US) 95351

( * ) Notice: Subject to any disclaimer, the term of this patent is extended or adjusted under 35 U.S.C. 154(b) by 0 days.

(21) Appl. No.: 09/888,983

(22) Filed: Jun. 25, 2001

(51) Int. Cl.$^7$ ................................................. A01B 9/00
(52) U.S. Cl. ............................. 172/69; 172/71; 172/73; 172/158; 172/146
(58) Field of Search ............................. 172/69, 71, 73, 172/105, 107, 156, 157, 158, 310, 452, 776, 146; 111/52, 57, 54, 58

(56) References Cited

U.S. PATENT DOCUMENTS

| | | | |
|---|---|---|---|
| 34,751 A | * | 3/1862 | Gordon |
| 197,204 A | * | 11/1877 | Concannon et al. |
| 978,427 A | * | 12/1910 | Bankhead |
| 1,611,358 A | * | 12/1926 | Miller |
| 1,744,312 A | * | 1/1930 | Jansson |
| 2,161,705 A | | 6/1939 | Haines |
| 4,212,254 A | * | 7/1980 | Zumbahlen |
| 4,249,613 A | * | 2/1981 | Scribner |
| 4,361,191 A | * | 11/1982 | Landoll et al. |
| 4,537,262 A | * | 8/1985 | Van Der Lely |
| 4,919,211 A | * | 4/1990 | Cope |
| 5,622,227 A | | 4/1997 | McDonald |

FOREIGN PATENT DOCUMENTS

| | | |
|---|---|---|
| DE | 19630079 | 1/1998 |
| GB | 2345627 | 7/2000 |
| WO | WO 00/47033 | 8/2000 |

OTHER PUBLICATIONS

Noble Mix–N–Till brochure, Jan. 1983, 4 pages.*
Noble Mix 'N' Till Seed Bed Finisher Can Handle It! brochure, Jan. 1985, 8 pages.*
Krause Landsman brochure, Sep. 1989, 6 pages.*
ASAE EP291.2 "Terminology and Definitions for Soil Tillage and Soil Tool Relationships," ASAE Standards 1999, pp. 115–118 (Dec. 1998).
SAE S414.1 "Terminology and Definitions for Agricultural Tillage Implements," ASAE Standards 1999, pp. 260–271 (Dec. 1998).

* cited by examiner

Primary Examiner—Victor Batson
(74) Attorney, Agent, or Firm—Sullivan Law Group

(57) ABSTRACT

The farm implement of this invention is movable across ground along a direction of travel for tillage. The farm implement includes at least a frame and a disc/drive unit. The disc/drive unit includes first and second pluralities of discs, each having a ground-engaging outer periphery defining a plane angled acutely relative to the direction of travel. The first discs are angled to an opposite side of the direction of travel than the second discs. Positioned in front of the first discs is a ground-engaging driver rotatably coupled to the frame for rotating as the driver engages and is moved across the ground along the direction of travel. A driven flow controller is rotatably coupled and situated between the plurality of first discs and the plurality of second discs. The ground-engaging driver is operatively controlling and preferably accelerating the rotational speed of the driven flow controller.

39 Claims, 17 Drawing Sheets

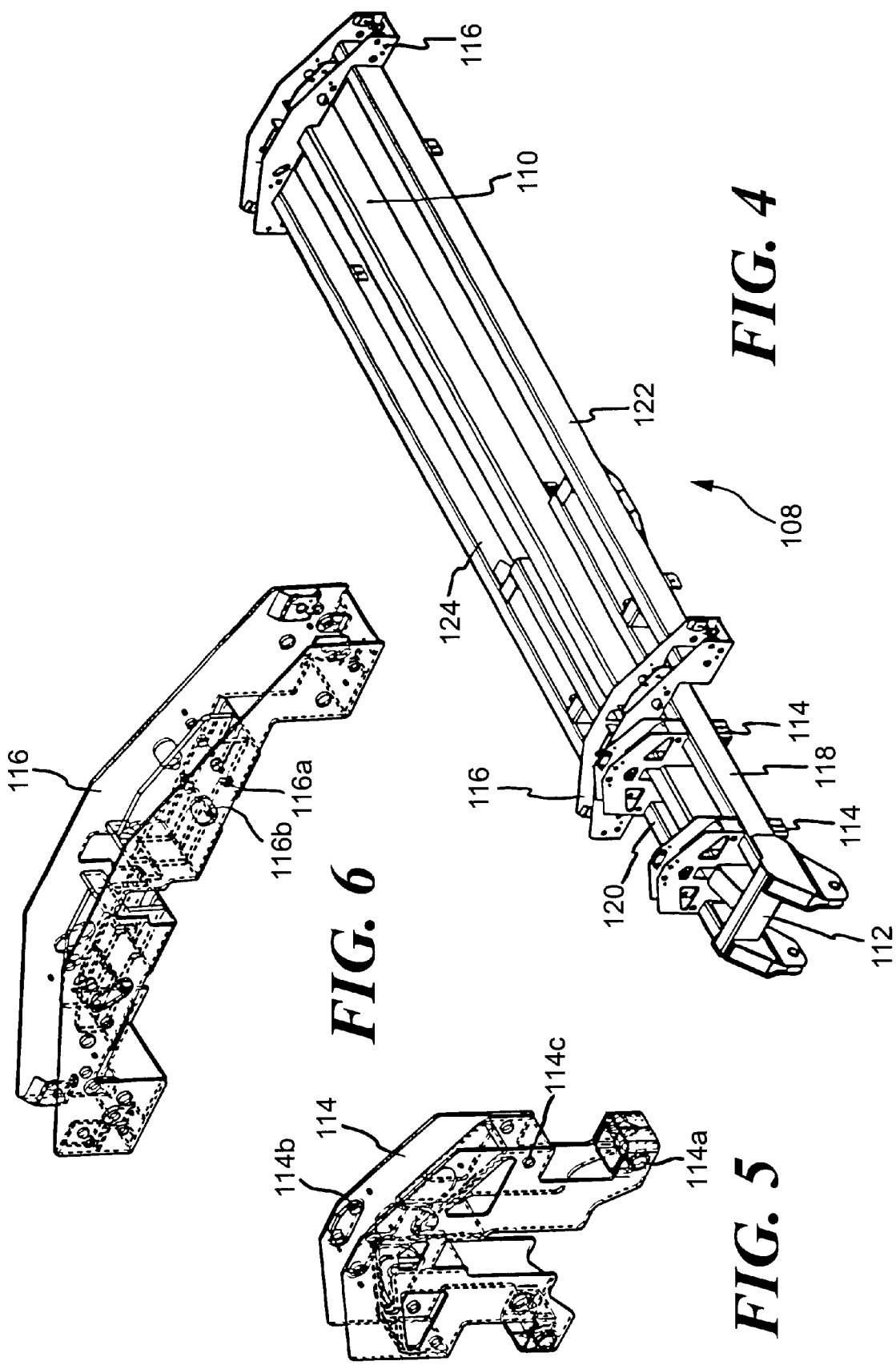

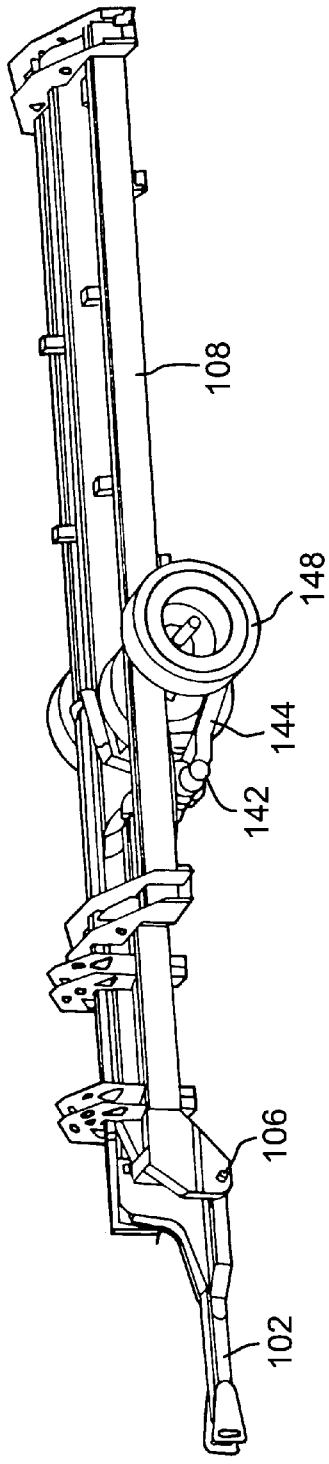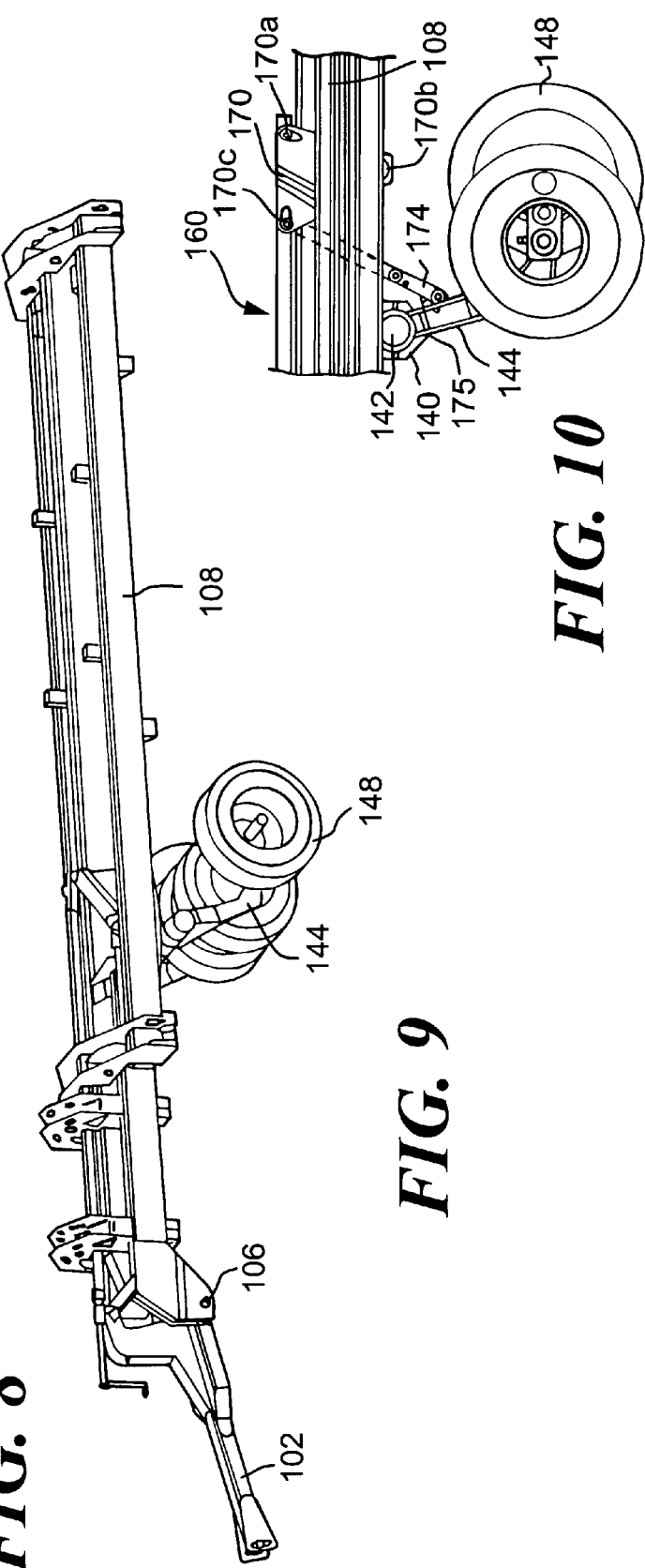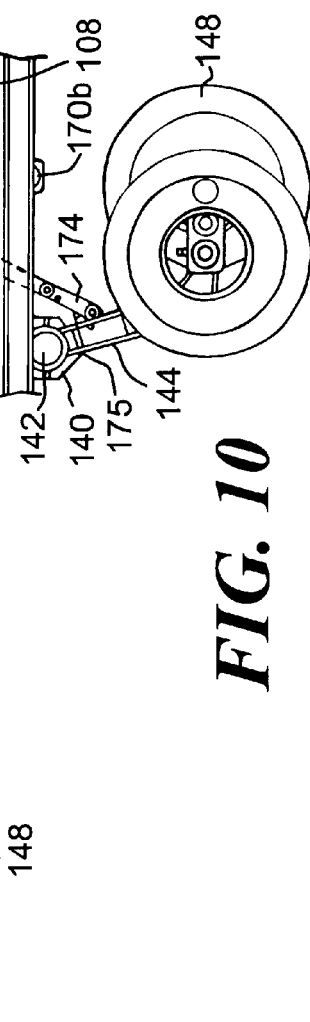

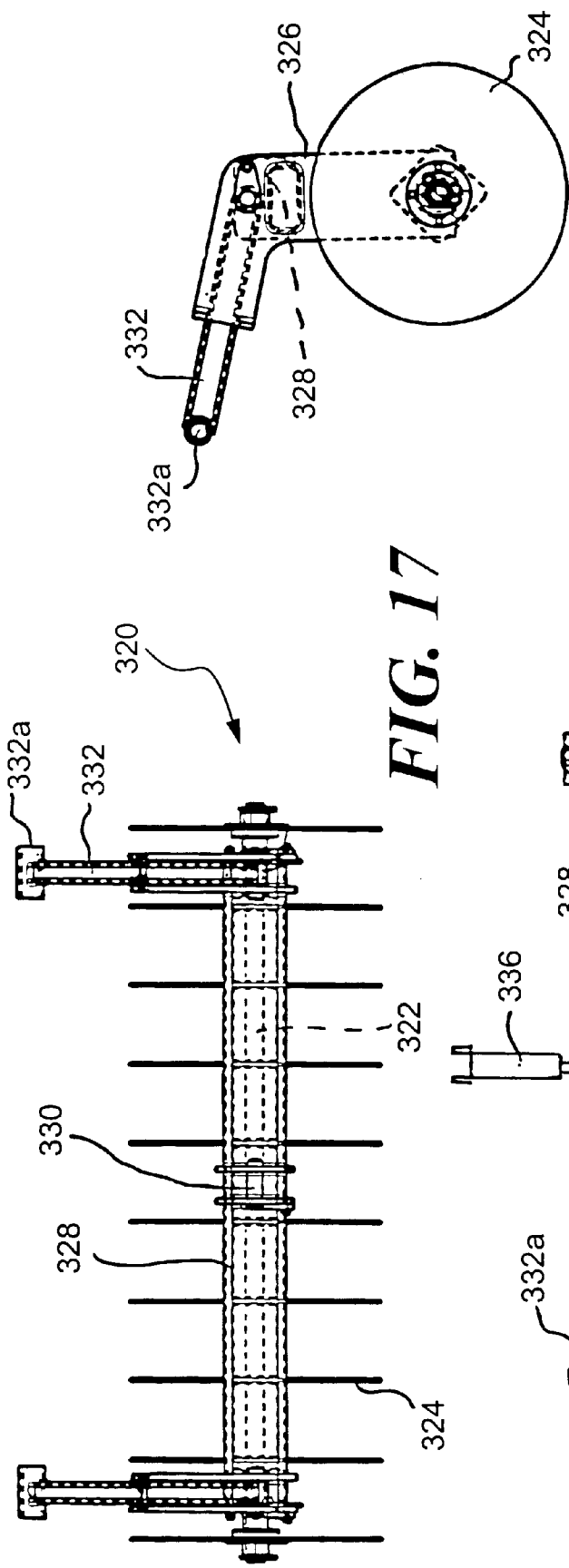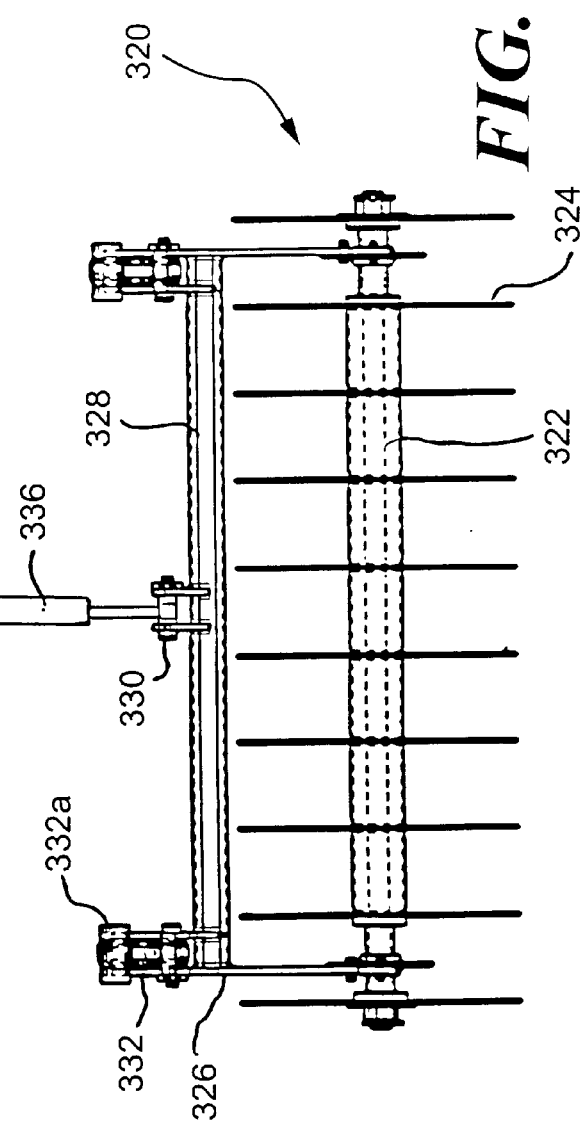

MULTI-FUNCTION FARM IMPLEMENT FOR TREATING SOIL

BACKGROUND OF THE INVENTION

1. Field of the Invention

This invention relates to the field of farm equipment for breaking and mixing soil, especially for preparing a seedbed for planting. Particularly preferred aspects of the invention relate to the field of farm implements having multiple cultivating devices that manipulate the soil in distinct ways to collectively form a level seedbed with a consistent depth by a single pass of the implement. This invention further relates to the planting of crops and incorporation of fertilizers and herbicides into a seedbed.

2. Description of the Related Art

Farmers for years have been searching for an implement that would allow them to convert compacted soil into a level seedbed with a consistent depth for providing excellent conditions for planting of a crop. It is also desirable for grass or stubble growing or disposed on top of the soil to be worked into and uniformly through the seedbed so that it does not interfere with a planting implement passing through the seedbed.

Farmers have used a variety of implements in attempts to provide their fields with a loose or firm, level seedbed of a consistent depth. For instance, a farmer might first work the entire field with a v-chisel, chisel plow or disk implement to loosen and break compacted soil. The farmer might then work the entire field with an implement having a plurality of S-tines, C-shanks, or other blades to further mix the soil and attempt to break down some of the larger soil clods. Thereafter, a farmer sometimes might use an implement with a reel having a plurality of blades for breaking clods into smaller sizes and chopping up the debris still remaining on the top of the soil. In yet a fourth pass over the entire ground, a farmer might use an implement having rows of rollers, each roller having a plurality of longitudinal blades disposed about its periphery for mixing and blending the soil conditioned from the previous passes through the field with the other implements. Such rollers serve to position and incorporate the debris under and within the seedbed.

Multiple passes with different implements as described above do not necessarily provide a level seedbed with a consistent depth and can cause compaction of the soil, especially moist soil. Compaction of soil can reduce crop yields. During the multiple passes with different implements, the implement being used typically bounces and rocks as it is pulled across the field. Thus, the first implement that is pulled across the field will not have a consistent cultivation depth, but will have a cultivation depth that varies depending upon the location in the field and the compaction of the ground. As a second implement is pulled through the field thereafter, the second implement will also rock and bounce as it is being pulled, because the field had been non-uniformly treated by the first implement. As is apparent, the second implement will not rock and bounce in a manner identical to that of the first implement. Thus, the cultivation depth of each implement is likely to be different and the conditioning of the soil provided by the implements is likely to be non-uniform because of the above-described conditions. The inconsistencies in the soil condition and seedbed depth are multiplied each time a pass is made through a field with a different implement.

As is also apparent, attempting to set different separately operated implements such that they operate at the exact same depth is likely to be very difficult if not impossible. Each implement will likely have a different depth-setting structure with different adjustments and calibrations. Therefore, the use of multiple passes with multiple implements to prepare a level seedbed with a consistent depth is impractical in most instances.

Further, the multiple-pass, multiple implement techniques described above do not allow for efficient incorporation of fertilizer or fumigants or the like into a seedbed. More particularly, if a fertilizer or seed is applied to the top of the soil and not incorporated within a particular period of time, the effectiveness of the fertilizer or fumigants can be lost. Therefore, fertilizer or the like applied between passes of an implement can result in loss of effectiveness of the fertilizer if the second pass is not made expeditiously. Factors such as weather and equipment maintenance may prevent a farmer from being able to make an additional pass within the desired amount of time.

Other implements have been used in attempts to solve the problems described above. One such implement is disclosed in U.S. Pat. No. 5,622,227 and comprises a multi-functioned farm implement for treating soil. The multi-functioned farm implement comprises a plurality of rows of different cultivating devices mounted on a frame that is pulled by a tractor or other vehicle of suitable horsepower to pull the implement. Among the cultivating devices that may be used with the '227 farm implement are the following: a cultivating device which is commercially available under the name "DYNA-DRIVE" manufactured by Bomford Turner LTD of Evesham Worcs., England; S-tines; chopping and breaking reels; and finishing reels. Although the '227 patent farm implement has proven to be much more effective than the conventional techniques and implements described above, the '227 patent farm implement does have some drawbacks. In particular, it has been found that the '227 patent farm implement has limited penetration into compacted ground of about 15 cm (6 inches) deep, making the implement principally useful for secondary tillage. Additionally, it is difficult to variably and individually control the penetration depth of each of the cultivating devices of the '227 patent farm implement, thus restricting to some degree the ability to tailor the farm implement for particular fields or applications.

Another implement that has been used is the Wishek 3. Model Disc, which is commercially available from Wishek Steel and Manufacturing. This implement comprises a frame, a front row of concave discs mounted rotatably on the frame, and a rear row of concave disc mounted rotatably on the frame and spaced behind the front row of concave discs. The concave faces of the front discs and the rear discs face in generally opposite directions to each other, and are exposed yet offset by a predetermined angle to the direction of travel. Although this implement was designed for primary tillage, it has been found that operation of this implement at high rates (for example, 5 mph or higher) leads to inconsistent treatment of fields and does not always prepare the desired level seedbed of consistent depth needed for planting. Soil tends not to flow smoothly through the implement, but to accumulate between the discs. As a consequence, soil displaced by the front row of discs does not flow consistently into the rear row of discs, so that the rear row of discs has limited effectiveness in inverting and further breaking the soil. Moreover, accumulation of soil between discs can deleteriously affect the performance of the discs. Accordingly, debris such as stubble or grass remains on the top of the soil after the implement has passed, thus, interfering with planting.

OBJECTS OF THE INVENTION

Accordingly, one object of this invention is to provide a farm implement capable of primary tillage or secondary for preparing a level seedbed with a consistent depth from unprepared compact soil in a single pass.

It is another object of this invention to provide a farm implement that has interchangeable parts to allow switching between primary tillage and secondary tillage.

It is still another object of this invention to provide a farm implement having a plurality of cultivating devices that are independently movable for variably controlling the penetration depth of each of the cultivating devices.

Additional objects and advantages of the invention will be set forth in the description that follows, and in part will be apparent from the description, or may be learned by practice of the invention. The instrumentalities and combinations pointed out in the appended claims may be used to realize and obtain one or more of these and objects and advantages of the invention.

SUMMARY OF THE INVENTION

To achieve the foregoing objects, and in accordance with the purposes of the invention as embodied and broadly described in this document, according to a first aspect of this invention there is provided a farm implement movable across ground along a direction of travel for tillage of the ground. The farm implement comprises a frame and a disc/drive unit. The disc/drive unit comprises a plurality of first discs coupled to the frame and preferably arranged along a first row, each of the first discs having a ground-engaging outer periphery, the outer peripheries of the first discs defining respective first planes angled acutely relative to the direction of travel. The disc/drive unit further comprises a plurality of second discs coupled to the frame and preferably arranged along a second row that is behind the first row along the direction of travel, each of the second discs having a ground-engaging outer periphery. The outer peripheries of the second discs define respective second planes angled acutely to an opposite side of the direction of travel than the first planes. The disc/drive unit still further comprises a ground-engaging driver and a driven flow controller, both of which are rotatably coupled to the frame. The ground-engaging driver rotates as the driver engages and is moved across the ground along the direction of travel. The driven flow controller is situated between the plurality of first discs and the plurality of second discs. The driven flow controller has a plurality of sweeping members, such as paddles, rotatable in a forward direction. The ground-engaging driver operatively controls the rotational speed of the driven flow controller, preferably by accelerating the rotational speed of the driver flow controller.

Preferably, the ground-engaging outer peripheries of the first discs each comprise notches extending substantially radially inward relative to the first discs and spaced circumferentially relative to each other. Likewise, the ground-engaging peripheries of the second discs preferably each comprise notches extending substantially radially inward relative to the second discs and spaced circumferentially relative to each other. The first and second rows of discs are preferably linear and preferably substantially perpendicular to the direction of travel. It is also preferably that each of the first discs and each of the second discs have a respective concave face exposed to the direction of travel.

The ground-engaging driver is preferably supported ahead of the plurality of first discs relative to the direction of travel. In one embodiment, the ground-engaging driver comprises a shaft and a plurality of sets of elongated members (preferably teeth having a longitudinal twist) extending from the shaft. The sets of elongated members may be spaced at respective axial locations along the axial length of the shaft, with each of the sets of elongated members comprising a plurality of the elongated members circumferentially spaced apart about the peripheral surface of the shaft. The elongated members have respective ends distal to the shaft for rotating along respective paths that optionally extend into a space between a corresponding set of adjacent ones of the first discs.

The driven flow controller may also comprise a shaft and the sweeping members (preferably elongated paddles) extending from the shaft. The plurality of sets of sweeping members may spaced at respective axial locations along the axial length of the shaft, with each of the sets of sweeping members comprising a plurality of the sweeping members circumferentially spaced apart about the peripheral surface of the shaft. Optionally, the sweeping members have respective ends distal to the shaft for rotating along respective paths that each extend into a space between a corresponding set of adjacent ones of the first discs and a space between a corresponding set of adjacent ones of the second discs.

In a particularly preferred variation of the invention, the disc/drive unit further comprises an accelerator unit for rotating the driven flow controller at a ratio of about 3:1 to about 3.5:1 relative to the ground-engaging driver.

In accordance with a second aspect of this invention, there is provided a farm implement movable across ground along a direction of travel for tillage of the ground. The farm implement comprises a frame, a soil breaking and loosening mechanism, a coulter assembly, a reel assembly, and a plurality of rows of chisel shanks or tines. The coulter assembly is coupled to the frame and comprises a rotatable coulter shaft situated behind the plurality of second discs along the direction of travel. The coulter shaft has an axis substantially perpendicular to the direction of travel. The coulter assembly further comprises a plurality of coulter blades spaced axially relative to each other along the axis of the coulter shaft. Each of the coulter blades has a ground-engaging outer periphery, the outer peripheries of the coulter blades defining respective planes parallel to the direction of travel. The reel assembly is coupled to the frame, preferably behind the coulter assembly, and comprises a rotatable reel shaft and a plurality of elongated (longitudinal) blades. The longitudinal blades are spaced about the periphery of the reel shaft along a helical pattern and have a ground-engaging edge for chopping debris and breaking soil clods. The frame supports the chisel shanks/tines, preferably in rows behind the reel assembly along the direction of travel. Each of the chisel shanks/tines has an edge portion distal to the frame for engaging and penetrating into the ground.

In a particularly preferred variation of the above-described second aspect of the invention, the soil breaking and loosening mechanism comprises a disc/drive unit comprising a plurality of first discs and a plurality of second discs. The first discs are coupled to the frame and arranged along a first row. Each of the first discs has a ground-engaging outer periphery defining a respective first plane angled acutely relative to the direction of travel. The second discs are coupled to the frame and arranged along a second row behind the first row. Each of the second discs has a ground-engaging outer periphery defining a respective second plane angled acutely to an opposite side of the direction of travel than the first planes. The disc/drive unit also comprises a ground-engaging driver and a driven flow controller. The ground-engaging driver is rotatably coupled to the frame for rotating as the driver engages and is moved across the ground along the direction of travel. The driven flow controller rotatably is coupled to the frame for rotating at a rotational speed and situated between the plurality of first discs and the plurality of second discs. The drive flow controller includes sweeping members extending therefrom and rotatable in a forward direction. The ground-engaging driver operatively controls the rotational speed of the driven flow controller, preferably by accelerating the rotational speed of the driver flow controller.

In a further preferred variation of the first and second aspects of the invention, the coulter assembly further comprises a pivotal coulter link connecting to the frame for suspending the coulter assembly from the frame, and a coulter assembly load-adjusting actuator for controlling the force that the coulter blades apply to the ground. In another preferred variation of the first and second aspects of the invention, the reel assembly further comprises a pivotal reel link connecting to the frame for suspending the reel assembly from the frame, and a reel assembly load-adjusting actuator for controlling the force with which the ground-engaging edges of the longitudinal blades contact the ground.

In still another preferred variation of the first and second aspects of the invention, the farm implement comprises a basket unit coupled to the frame and situated behind the plurality of second discs along the direction of travel. The basket unit comprises a forward roller and a rear roller rotatably supported by the frame. Each of the rollers comprises a shaft having a periphery and plurality of longitudinal blades. The longitudinal blades are spaced about the periphery of the shaft along respective helical patterns and each having a respective ground-engaging edge for mixing and blending soil with a rolling action. The basket unit may optionally further comprise a basket unit load-adjusting actuator for controlling the force with which the ground-engaging edges of the longitudinal blades contact the ground.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIG. 4 is an enlarged isolated isometric view of the frame of the farm implement of FIG. 1;

FIG. 5 is an isometric view of a front folding frame bracket of the central frame structure;

FIG. 6 is an isometric view of a rear folding frame bracket of the central frame structure;

FIGS. 8 and 9 illustrate the central frame structure of the farm implement, and in particular the wheels of the central frame structure in raised and lower positions, respectively;

FIG. 10 is a side elevation, fragmentary view of the bell crank assembly of the farm implement;

FIG. 17 is a top plan view of a coulter assembly of the farm implement;

FIG. 18 is a front elevation view of the coulter assembly of FIG. 17;

FIG. 19 is a side elevation view of the coulter assembly of FIGS. 17 and 18;

Figure 1:
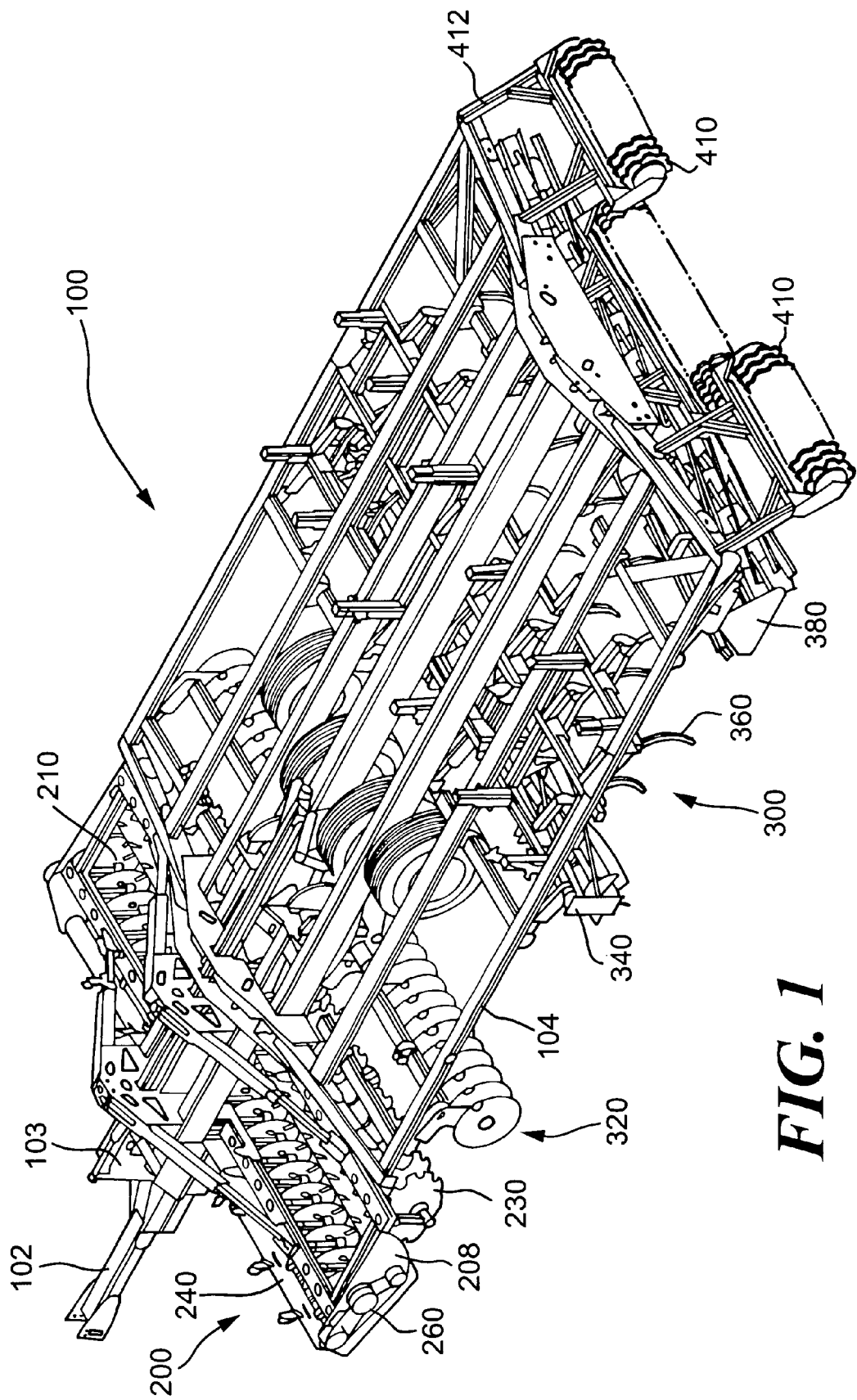
FIG. 1 is an isometric view of a farm implement embodying certain aspects of the present invention.

DETAILED DESCRIPTION OF PREFERRED EMBODIMENTS AND METHODS OF THE PRESENT INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

Figure 2:
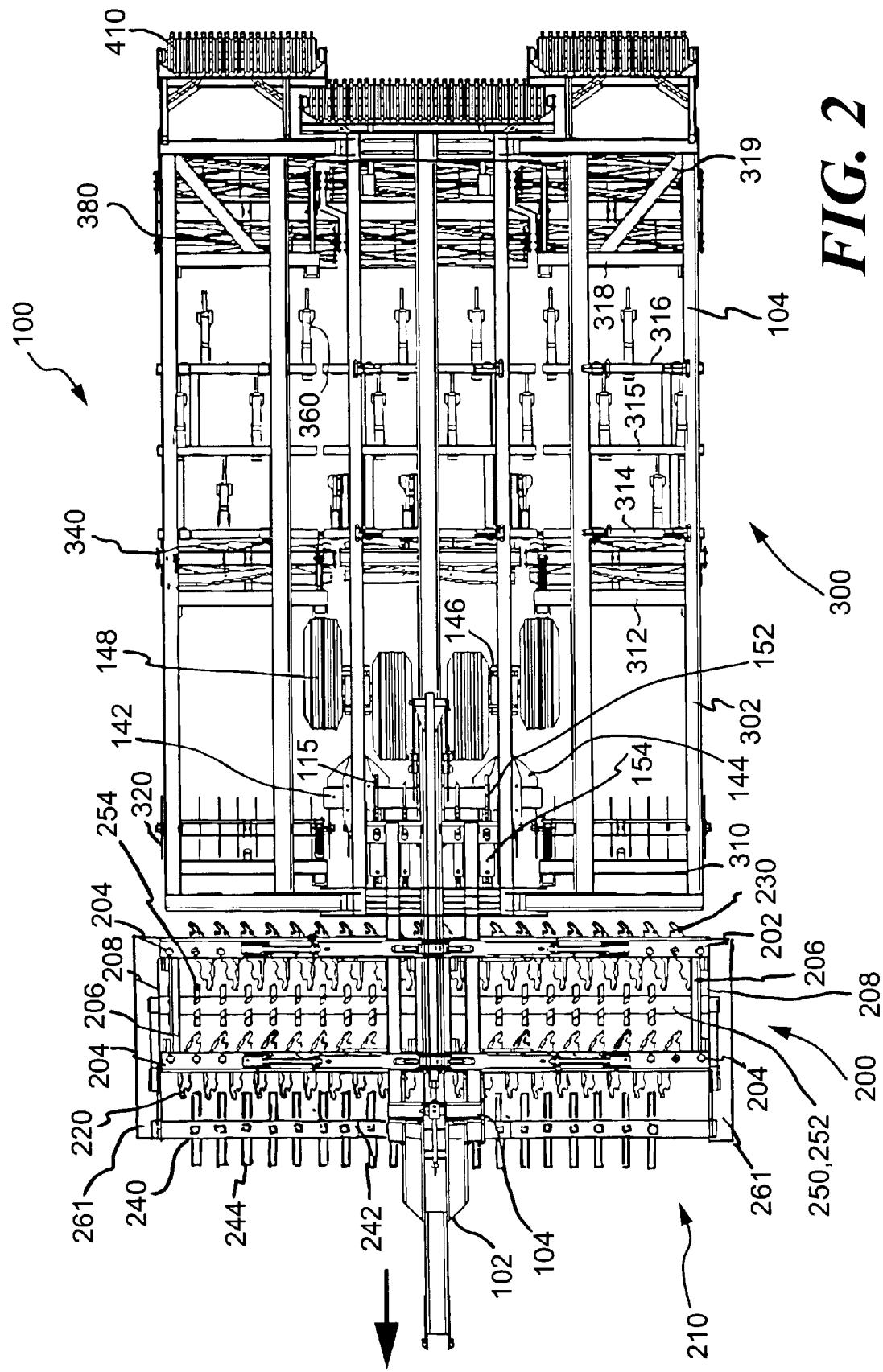
FIG. 2 is a top plan view of the farm implement of FIG. 1.
Figure 3:
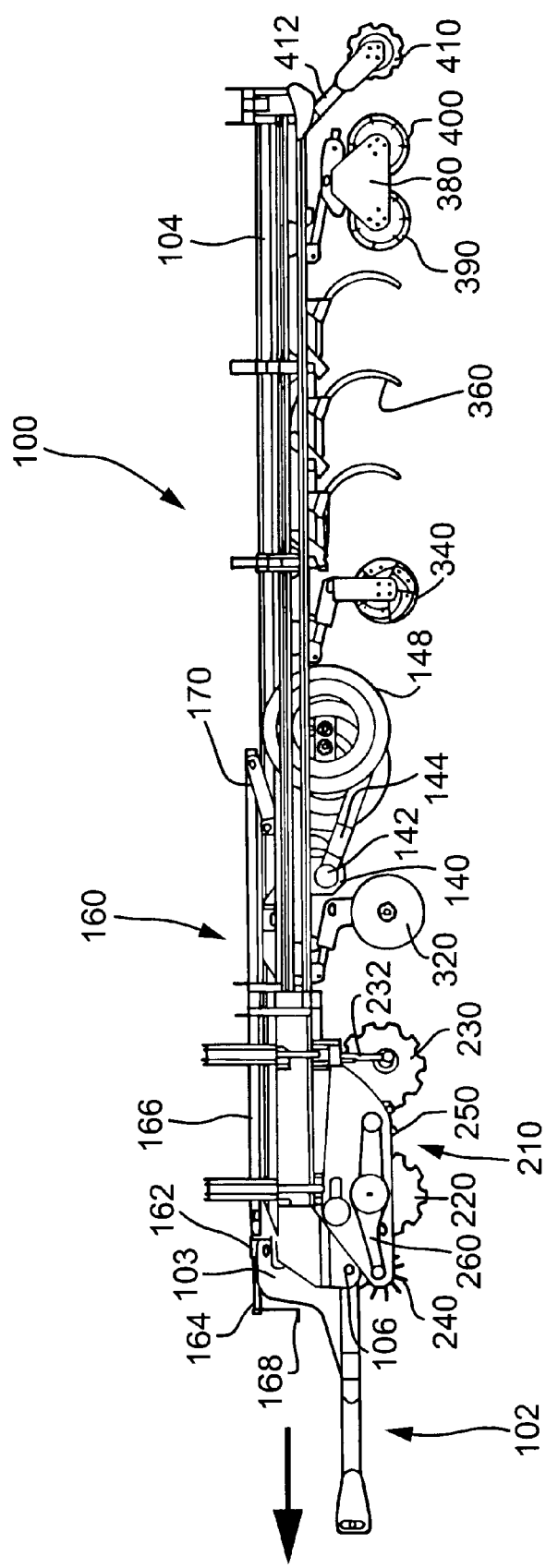
FIG. 3 is a side elevation view of the farm implement of FIG. 1.

Turning now to the drawings in greater detail and initially to FIGS. 1–3, a farm implement of the present invention is designated generally by the numeral 100. The farm implement 100 has a hitch portion 102 and a rigid frame 104. The frame 104 is preferably made out of hollow steel beams with rectangular cross sections. The hitch portion 102 is pivotally attached to the frame 104 generally at a location 106 as best shown in FIGS. 3, 8, and 9. The forward portion of the hitch portion 102 is attachable to the hitching structure of a tractor or other vehicle (not shown) for pulling the farm implement 100 across ground or soil along a direction of travel, as indicated by the arrows in FIGS. 2 and 3.

Figure 7:
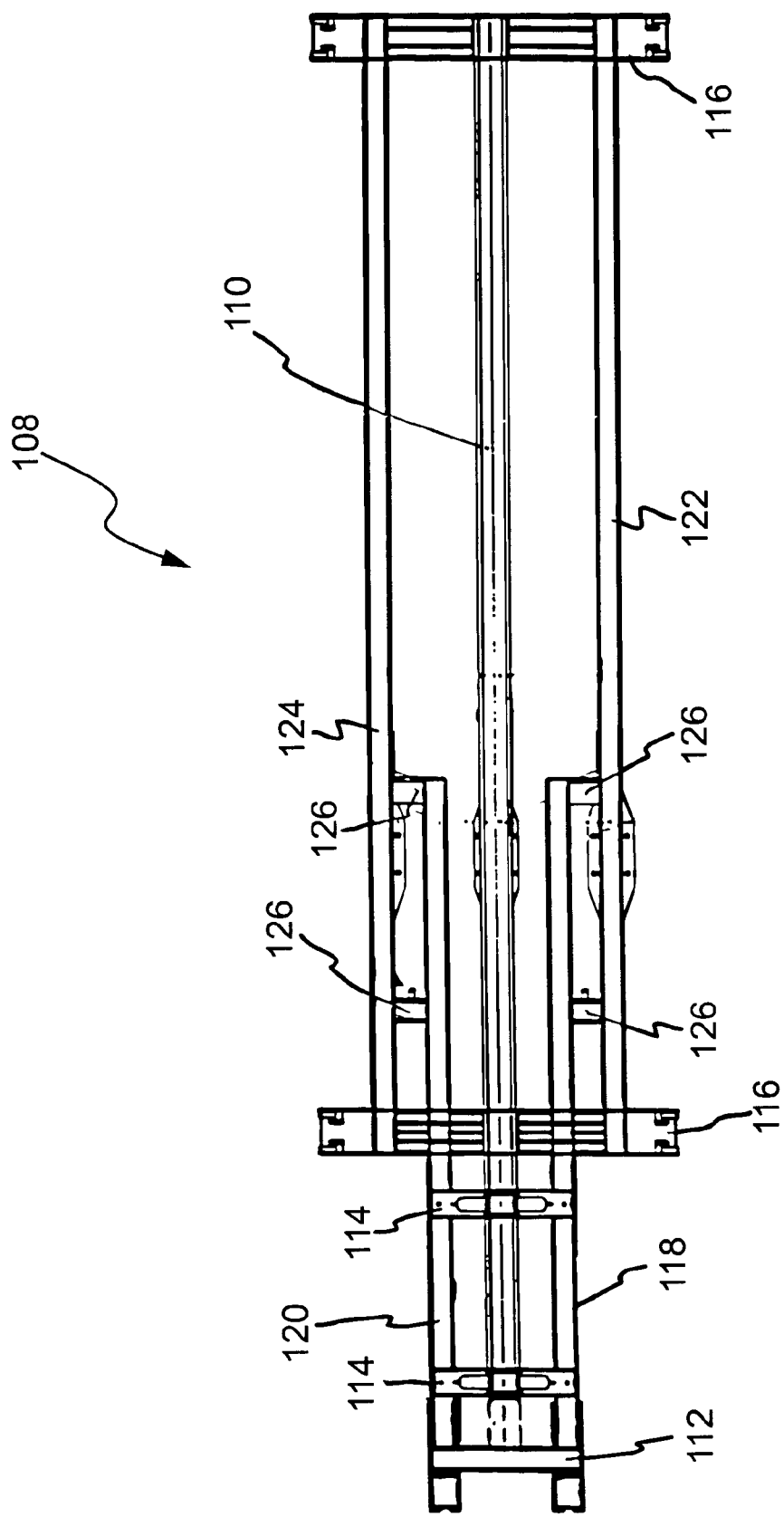
FIG. 7 is an enlarged, isolated top plan view of the frame of the farm implement of FIG. 1.

As shown in FIGS. 4 and 7, the frame 104 comprises a central frame structure generally designated by reference numeral 108. The central frame structure 108 comprises a central longitudinal support beam 110. Positioned generally transverse to and centered relative to the central longitudinal support beam 110 are a front lateral support beam 112, front folding frame brackets 114 (FIG. 5), and rear folding frame brackets 116 (FIG. 6). The longitudinal support beam 110 extends between the front lateral support beam 112 and one of the rear folding frame brackets 116. Front side support beams 118 and 120 extend generally parallel to the central longitudinal support beam 110 and are positioned on opposite sides of and set equidistant to the central longitudinal support beam 110. The front side support beams 118 and 120 are attached to the front lateral support beam 112, the front folding frame brackets 114, and one of the rear folding frame brackets 116. Rear side support beams 122 and 124 extend generally parallel to the central longitudinal support beam 110, and are positioned on opposite sides of and set equidistant to the central longitudinal support beam 110. The rear side support beams 122 and 124 are attached at their opposite ends to the rear folding frame brackets 116. Main frame cross members 126 connect the front side support beams 118 and 120 to the rear side support beams 122 and 124, respectively, to add structural support to the central frame structure 108. The beams 110, 112, 118, 120, 122, and 124 are arranged in substantially the same horizontal plane and are connected together by welds, bolts and/or other suitable fasteners. The front and rear folding frame brackets 114 and 116 are also connected to the beams 110, 112, 118, 120, 122, and 124 by welds, bolts, or other suitable fasteners. The functions of the front and rear folding frame brackets 114 and 116 will be described in detail below.

Although not shown in the figures, the frame 104 may carry a fertilizer or herbicide tank and fertilizer spraying equipment. The frame 104 may also carry a planter hopper with feed distribution capability. Thus, spraying equipment can be disposed before or after any of the cultivating devices connected to the frame 104, such devices being more fully described below.

With reference to FIGS. 2, 3, and 8–10, a wheel-pivoting flange 140 extends from the lower surface of the central frame structure 108. A wheel-pivoting shaft 142 is pivotally received in apertures in the flanges 140. Wheel-supporting arms 144 are fixedly attached, such as by welding, to the wheel-pivoting shaft 142. The wheel-supporting arms 144 may take the configuration of a yoke, with the yoke portion attached to the wheel-pivoting shaft 142. Each of the wheel-supporting arms 144 supports spindles 146 rotatably carrying two wheels 148. The wheels 148 are offset with respect to each other on the spindle 146, as best shown in FIG. 2. This arrangement is designed for stabilization to minimize bouncing of the implement 100 on a seedbed or highway. As a consequence, consistent and uniform depth control of a seedbed may be obtained.

Lugs 152 are attached, such as by welding, at one of their ends to the periphery of the wheel-pivoting shaft 142. The other ends of the lugs 152 are pivotally connected to one of the ends of the hydraulic cylinders 154 by a pivot-pin arrangement. The other ends of the cylinders 154 are connected to the frame 104 by a pivot-pin arrangement. Pressurization of the cylinders 154 pushes on the lugs 152 to pivot the wheel-pivoting shaft 142. Pivoting of the wheel-pivoting shaft 142 causes the arms 144 to move with the shaft 142, thus lowering the wheels 148. On the other hand, depressurizing the cylinders 154 pivots the wheel-pivoting shaft 142 in the opposite direction to raise the wheels 148. As is apparent, lowering of the wheels 148 allows for movement of the implement 100 on a road and raising of the wheel 148 allows for adjustments to the depth of the resulting seedbed.

Referring to FIGS. 3 and 10, a depth-adjusting and leveling arrangement 160 is also provided for adjusting the front or rear depth at which the implement 100 enters the soil. The depth-adjusting and leveling arrangement 160 comprises a coupling 162 attached to tongue 103 of the hitch portion 102. A threaded shaft 164 is positioned through an aperture of the coupling 162 and threadably received in an adjusting shaft 166. The threaded shaft 164 has a handle 168 extending over the hitch portion 102. The opposite end of the adjusting shaft 166 is pivotally connected to corners 170a of triangular bell crank plates 170, which are pivotal about their lower corners 170b, which are pivotally mounted to the frame 104. A frame leveling link 174 is pivotally connected at one of its ends to the front corner 170c of the bell crank plate 170 and, at the other end, to a wheel arm leveling lug 175, which is fixed, such as by welding, to the wheel-pivoting shaft 142. Therefore, when the hydraulic cylinders 154 are pressurized such that the wheels 148 are down, turning the handle 168 to pivot the bell crank plate 170 rearward applies a load to the back of the frame 104, causing the frame 104 to tilt rearward. On the other hand, turning the handle 168 to tilt the bell crank plate 170 forward lifts the rear of the frame 104 upward and decreases the distance between the front of the frame 104 and the ground.

Other wheel-raising and wheel-lowering devices and depth-adjusting and leveling arrangements may be used in the scope of this invention, including those described in U.S. Pat. No. 5,622,227, the disclosure of which is incorporated herein by reference.

Figures 15, 16:
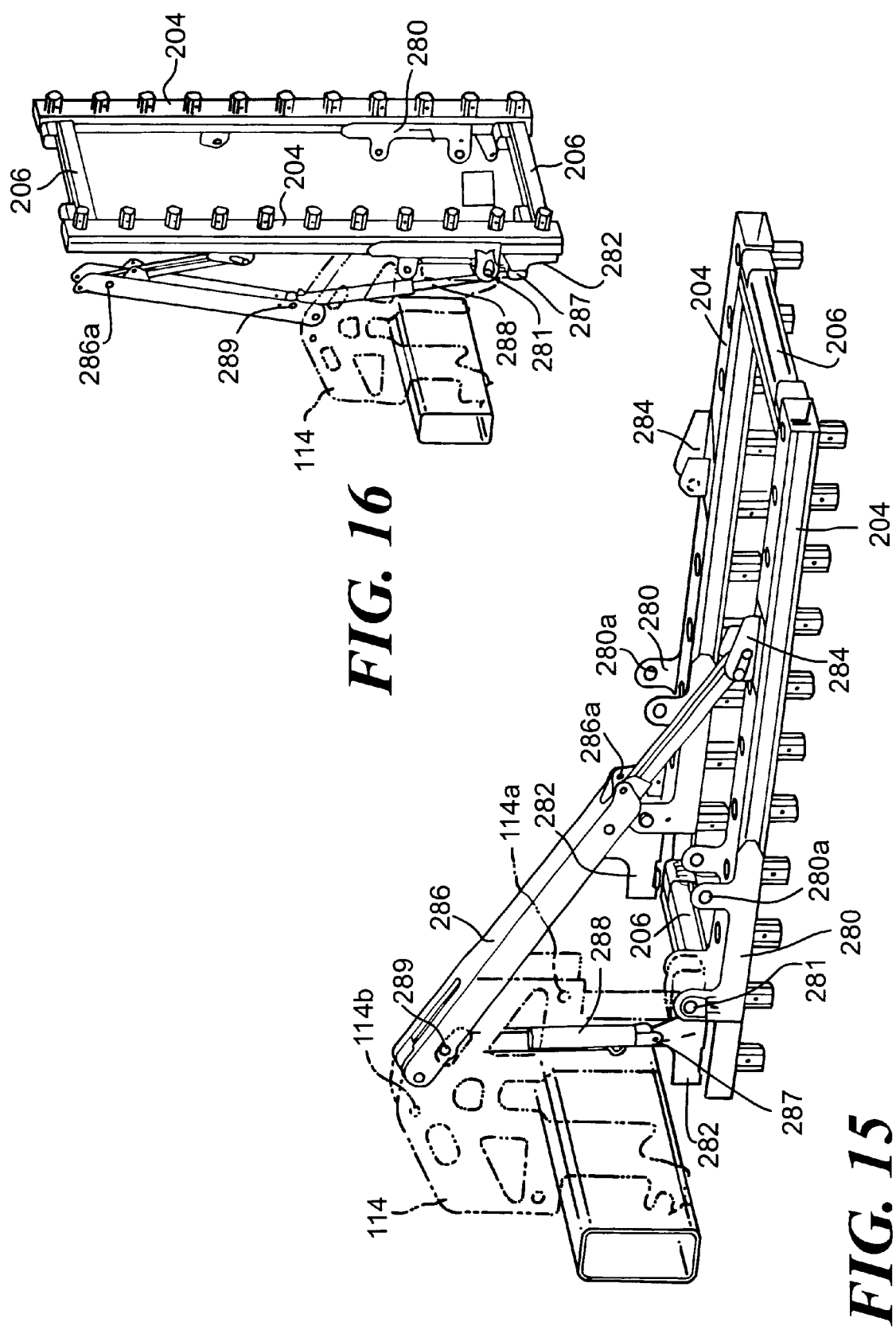
FIG. 15 is an isometric fragmentary view of a front frame wing in a deployed (lowered) position.
FIG. 16 is an isometric fragmentary view of the front frame wing of FIG. 15 in a folded position.

The frame 104 further includes a front folding frame assembly 200 comprising left and right front frame wings 202, and a rear folding frame assembly 300 comprising left and right rear frame wings 302. The left and right front frame wings 202 are located on opposite sides of the central frame structure 108. Each of the front frame wings 202 comprises lateral wing beams (or members) 204 having one end portion coupled to the central frame structure 108 and the other end portion distal to the central frame structure 108. Crossbeams 206 connect the lateral wing beams 204 at their ends, as best seen in FIGS. 15 and 16. Laterally spaced end panels 208 are positioned outside of the crossbeams 206. The raising and lowering of the front frame wings 202 will be described in greater detail below.

Supported by the front folding frame assembly 200 are left and right compacted soil breaking and loosening mechanisms 210. With particular reference to FIGS. 1–3, 11, and 14, the each of the mechanisms 210 is preferable a disc/drive unit 210 comprising a row of first discs 220, a row of second discs 230, a ground-engaging driver 240, and a driven flow controller 250.

Figure 11:
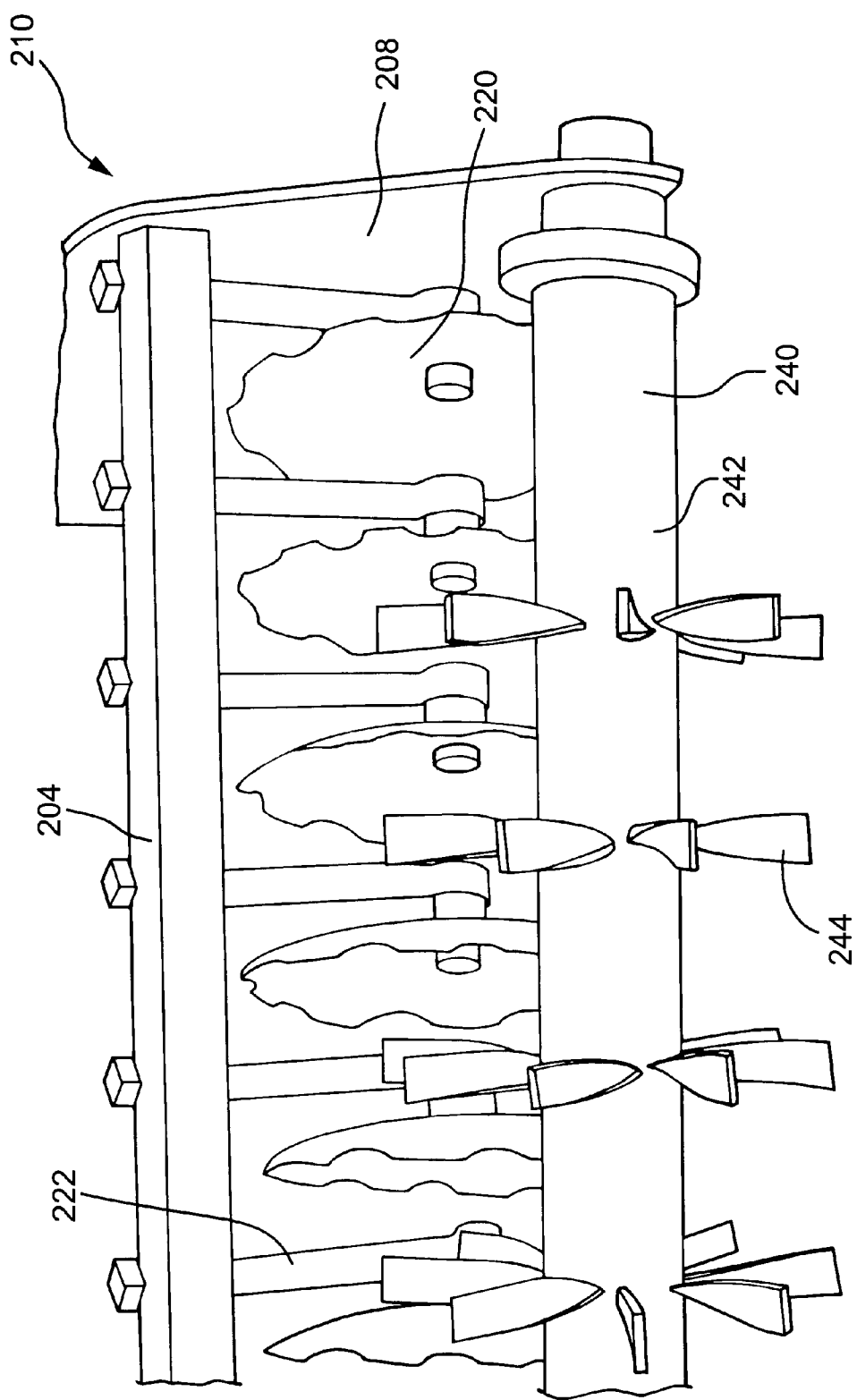
FIG. 11 is a front fragmentary view of the a compacted soil breaking and loosing mechanism of the farm implement of FIGS. 1–3.

For each of the disc/drive units 210, the first discs 220 are coupled to the respective one of the front frame wings 202 and arranged in a first row, which as illustrated is preferably substantially perpendicular to the direction of travel. The second discs 230 are also coupled to the front frame wings 202, and are arranged in a second row, which is behind the row of first discs 220 and is substantially perpendicular to the direction of travel. Preferably, the first row and second row of discs 220 and 230 are each linear, with the second row of discs 230 behind and parallel to the first row of discs 220. The first discs 220 and the second discs 230 are interposed between the end panels 208. As shown in FIG. 11, each of the first discs 220 is individually coupled to and suspended from one of the lateral wing beams 204 by a respective first arm 222. Likewise, each of the second discs 230 is individually coupled to and suspended from the other one of the lateral wing beams 204 by a respective second arm 232. The first and second discs 220 and 230 are coupled concentrically and rotatably to their respective arms 222 and 232 to allow rotational movement of the discs 220 and 230 during movement and penetration of the discs 220 and 230 across the ground along the direction of travel. Suitable discs and bearing structures are available through Wishek Steel and Manufacturing.

Figure 27:
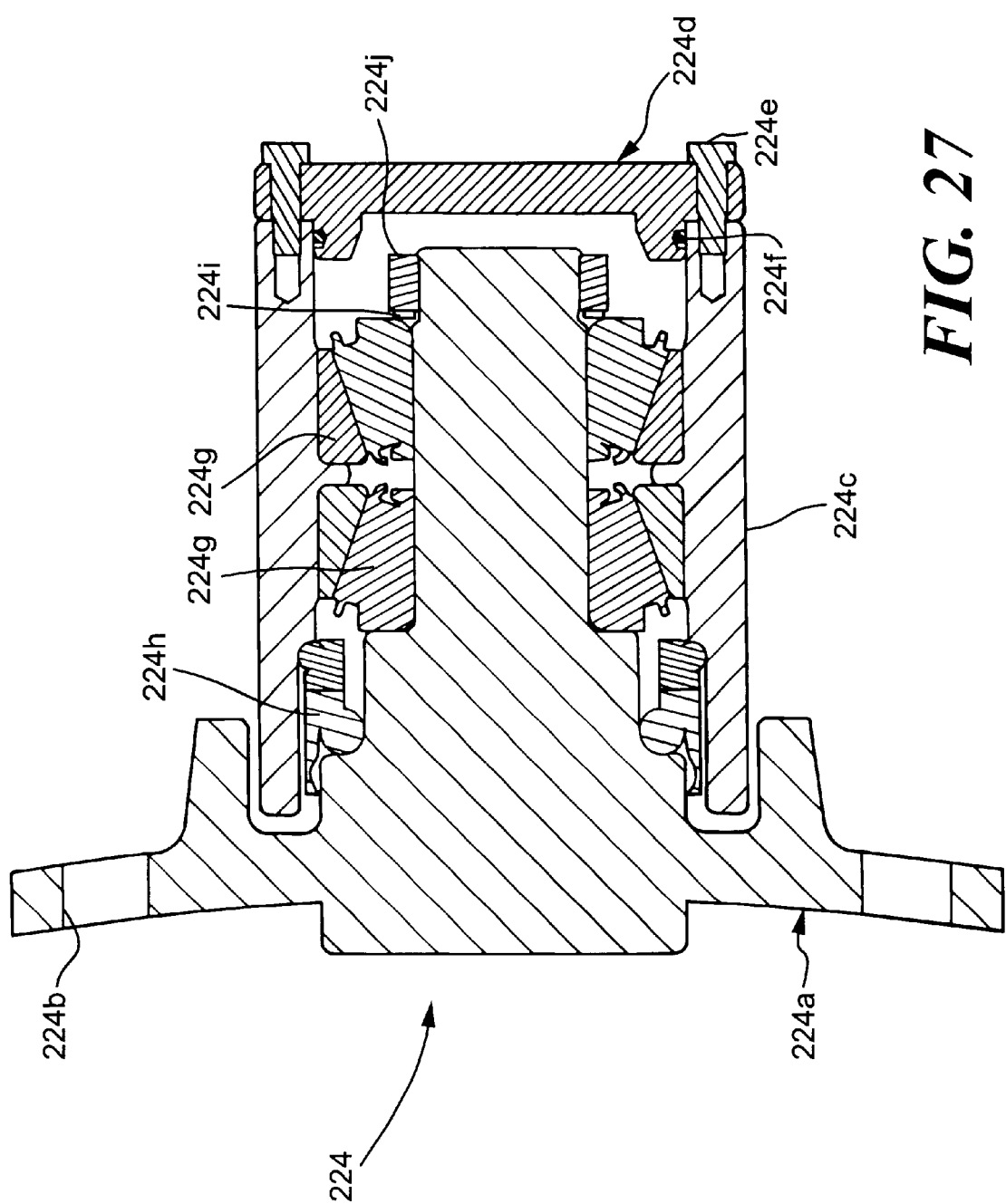
FIG. 27 is a schematic view of a bearing arrangement.

A suitable bearing arrangement 224 that may be used for rotatably connecting the first and second discs 220 and 230 to the first and second arms 220 and 230, respectively, is shown in FIG. 27. The bearing arrangement 224 includes a spindle 224a having bolt holes 224b, which bolts may be inserted through to attach the spindle 224a to a corresponding one of the discs 220 or 230. The spindle 224a is mated with housing 224c, which in turn may be welded or otherwise fastened to a corresponding arm 222 or 232. A cap 224d is positioned at an opposite end of the housing 224c, and fastener pins 224e fasten the cap 224d to the housing 224c. O-ring 224f seals the interface between the housing 224c and the cap 224d. A bearing set 224g is positioned inside of the housing 224c to rotatably connect the housing 224c to the spindle 224a. Timkin HM89410 and HM89449 may be selected for the bearing set 224g. A mechanical seal 224h is positioned inside of the housing 224c to prevent debris from entering into the housing 224c and interfering with the operation of the bearing set 224g. Washer 224i and nut 224j hold the bearing set 224g on the spindle 224a. The illustrated bearing arrangement is presented by way of example, and is not to be considered exhaustive as to the scope of this invention.

Each of the first and second discs 220 and 230 has a respective ground-engaging outer periphery, which in the illustrated embodiment comprises notches, in particular semi-circular notches. For each disc 220 and 230, the notches extend substantially radially relative to the disc, and are spaced circumferentially relative to each other. It should be understood, however, that the notches on the first and second discs 220 and 230 are optional. It is also possible to use notches on the some of the discs, but not others. In this regard, it is within the scope of this invention for the peripheries of the discs 220 and 230 to have notches and/or protrusions of various shapes, sizes, and patterns.

As is also shown in the illustrated embodiment, the first discs 220 and second discs 230 preferably, but not necessarily, have respective concave faces exposed to the direction of travel of the farm implement 100. In a particularly preferred embodiment, the first and second discs 220 and 230 are 56 cm (22 inches) to 81 cm (32 inches), more preferably 71 cm (28 inches) in diameter.

As shown in FIG. 11, the outer peripheries of the first discs 220 define respective first planes angled acutely relative to the direction of travel. Likewise, the outer peripheries of the second discs 230 define respective second planes angled acutely relative to the direction of travel. The first planes are angled to an opposite side of the direction of travel than the second planes, so that the concave surfaces of the first discs 220 face in a substantially opposite direction to the concave surfaces of the second discs 230. The first planes and second planes are preferably angled relative to (and on opposite sides of) the direction of travel, i.e., the longitudinal axis of the implement 100 in the illustrated embodiment, by 10 degrees to 20 degrees, more preferably 15 degrees. Additionally, the first planes and second planes are preferably offset (tilted back) from vertical by an angle of 2 degrees to 10 degrees, more preferably 6 degrees.

In the illustrated embodiment, each of the disc/drive units 210 has a respective ground-engaging driver 240 coupled to the front frame wings 202 and positioned ahead of the plurality of first discs 220 relative to the direction of travel. In one preferred embodiment of the invention shown in FIG. 11, each ground-engaging driver 240 comprises a respective driver shaft 242 extending laterally across the width of the farm implement 100. The driver shaft 242 is rotatably connected at its opposite ends to the end panels 208 through a bearing structure or the like. (For each drive shaft 242, one of the end panels 208 to which the drive shaft 242 is connected is preferably positioned below the central frame structure 108.) As referred to herein, shaft may mean a tube welded or otherwise fastened about, preferably concentrically about, the shaft. A plurality of sets of elongated members, such as teeth or tines 244, is preferably provided, with the teeth 244 extending from the driver shaft 242. The sets of teeth 244 are preferably spaced at respective axial locations along the axial length of the driver shaft 242, with each of the sets of teeth 244 comprising a plurality of the teeth 244 circumferentially spaced apart about the peripheral surface of the driver shaft 242. By way of example, each set of teeth 244 may comprise 8 to 10 teeth. The elongated teeth 244 preferably have respective ends distal to the driver shaft 242 for rotating along respective paths, with the paths each extending into a space between a corresponding set of adjacent ones of the first discs 220. In a particularly preferred embodiment, the elongated teeth 244 are 15 cm (6 inches) to 30 cm (12 inches), more preferably 25 cm (10 inches) long, and angled towards to direction of rotation by 15 to 20 degrees from a radial position. The teeth 244 may be welded or attached with fasteners to the driver shaft 242. Preferably, the teeth 244 are made of metal, such as steel.

During movement of the farm implement 100 across the ground along the direction of travel, the teeth 244 of the ground-engaging driver 240 engage and penetrate the ground and rotate the driver shaft 242. Engagement of the teeth 244 against the ground, together with movement of the ground relative to the teeth 244, causes the driver shaft 242 to rotate. Preferably, the teeth 244 also serve the function of breaking up the soil of the seedbed.

As shown in FIG. 11, the teeth 244 may be twisted about 90 degrees along their length. Other arrangements and devices may be used as alternatives to the ground-engaging driver 240, so long as the driving function described below is performed. For example, the ground-engaging driver 240 may comprise a shaft with a helical blade or blades winding around the shaft 244, paddles, spikes, or other members.

The driven flow controller 250 is interposed between the plurality of first discs 220 and the plurality of second discs 230. The driven flow controller 250 is rotatably coupled to the end panels 208 and situated under the frame 104. More specifically, in the illustrated embodiment the driven flow controller 250 comprises a driven shaft 252 that is rotatably connected to the end panels 208 through a bearing structure or the like. Preferably, sets of elongated or sweeping members, such as elongated paddles 254, extend from the driven shaft 252. The elongated paddles 254 are preferably spaced apart at respective axial locations along the axial length of the driven shaft 252, with each of the sets of paddles 254 comprising a plurality of the elongated paddles 254 circumferentially spaced apart about the peripheral surface of the driven shaft 252. The elongated paddles 254 preferably have respective ends distal to the driven shaft 252 for rotating along respective paths extending into a space between a corresponding set of adjacent ones of the first discs 220 and a space between a corresponding set of adjacent ones of the second discs 230. In a particularly preferred embodiment, the paddles 254 are about 15 cm (6 inches long), have a base width of about 12 to 15 cm (5 to 6 inches), and terminate at an end portion of 7 to 10 cm (3 to 4 inches) wide. It is also particularly preferred that the paddles 254 are offset away from a direction of rotation by about 10 to 15 degrees relative to the radial direction. Although the elongated members are shown as paddles, other structures, such as spikes, tines, planks, and other devices capable of preventing accumulation of soil in the disc/drive unit 210 may be used. The paddles 254 may be welded or attached with fasteners to the shaft 252. Preferably, the paddles 254 are made of metal, such as steel.

Figure 12:
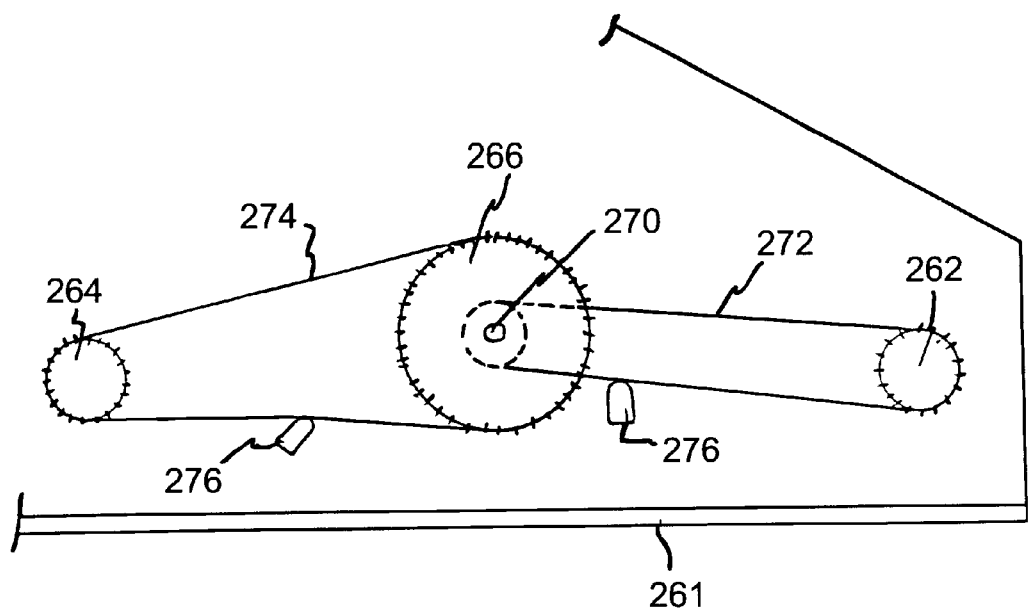
FIG. 12 is a side elevation, fragmentary view of a gear unit of the farm implement.
Figure 13:
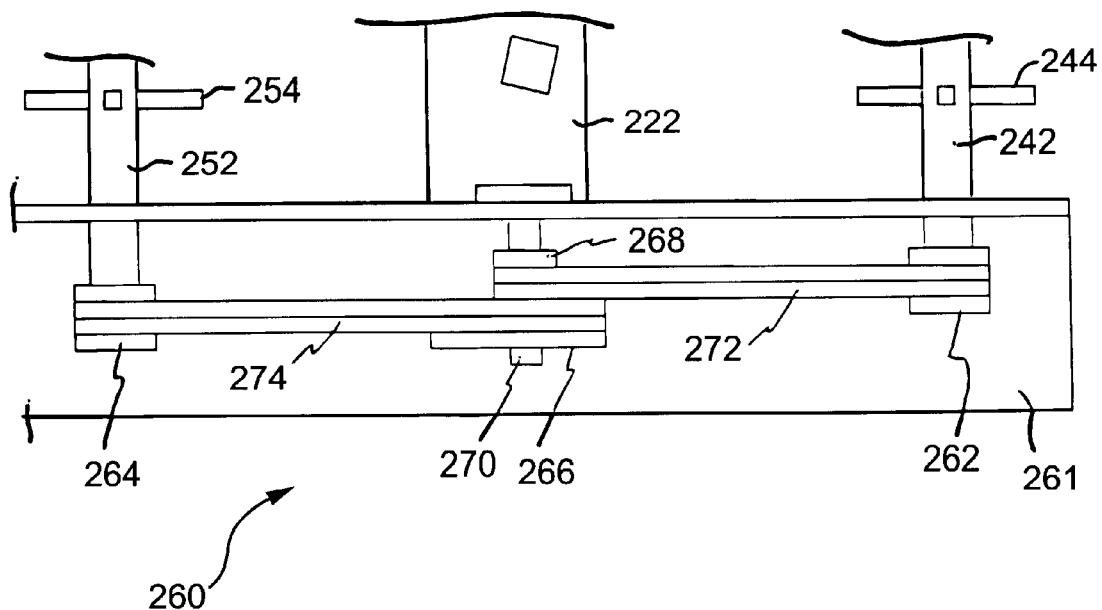
FIG. 13 is a top plan, fragmentary view of the gear unit of FIG. 12.

For each of the units 210, the ground-engaging driver 240 operatively controls the rotational speed of the driven flow controller 250 with an accelerator unit 260, as shown in FIGS. 12 and 13. The accelerator unit 260 is set on a platform 261 adjacent one of the end panels 208. The accelerator unit 260 comprises a sprocket 262 positioned on one end of the driver shaft 242 and a sprocket 264 is positioned on one end of the driven shaft 252. The sprockets 262 and 264 are positioned outside of the end panels 208. Positioned between the sprockets 262 and 264 and supported by the end panel 208 are a large hub sprocket 266 and a small hub sprocket 268, which in FIG. 12 is behind the large hub sprocket 266. Hub sprockets 266 and 268 are concentrically positioned relative to each other on shaft 270. A first chain 272 operatively couples the sprocket 262 to large hub sprocket 266. A second chain 274 operatively couples the sprocket 264 to the small hub sprocket 268. The sprockets 262, 264, 266, and 268 are sized such that when the driver shaft 242 rotates sprocket 262, the sprocket 264 and driven shaft 252 are rotated at a gear ratio of preferably 3:1 to 3.5:1 relative to the driven shaft 242, although other gear ratios may be obtained. Thus, the driven shaft 252 and its paddles 254 are accelerated to an increased rotational speed. Chain tighteners 276 are also positioned on the panel 208 adjacent the hub sprockets 266 and 268.

It should be understood that the accelerator unit 260 may possess different structures and arrangements that those illustrated and described above. For example, the chains 272 and 274 may be replaced with gear mechanisms or belts. Also, the hub sprockets 266 and 268 may be eliminated, so that a chain or belt directly connects the sprockets 262 and 264. These and other modifications to the accelerator unit 260 would be within the purview of persons having ordinary skill in the art and reference to this disclosure.

The disc/drive units 210 are most useful for primary tillage, although also useful for secondary and deep tillage. The disc/drive units 210 are preferably detachable and reattachable to the frame 104 for allowing alternative compacted soil and breaking mechanisms, such as secondary tillage mechanisms, to be attached to the frame 104. For example, the compacted soil breaking and loosening mechanism 210 may be a cultivating device which is commercially available under the name DYNA-DRIVE® manufactured by Bomford Turner LTD of Evesham Worcs., England. The DYNA-DRIVE® cultivating device is fully described in U.S. Pat. No. 5,622,227, the disclosure of which is incorporated herein by reference. The DYNA-DRIVE® is especially useful for secondary tillage.

Figure 14:
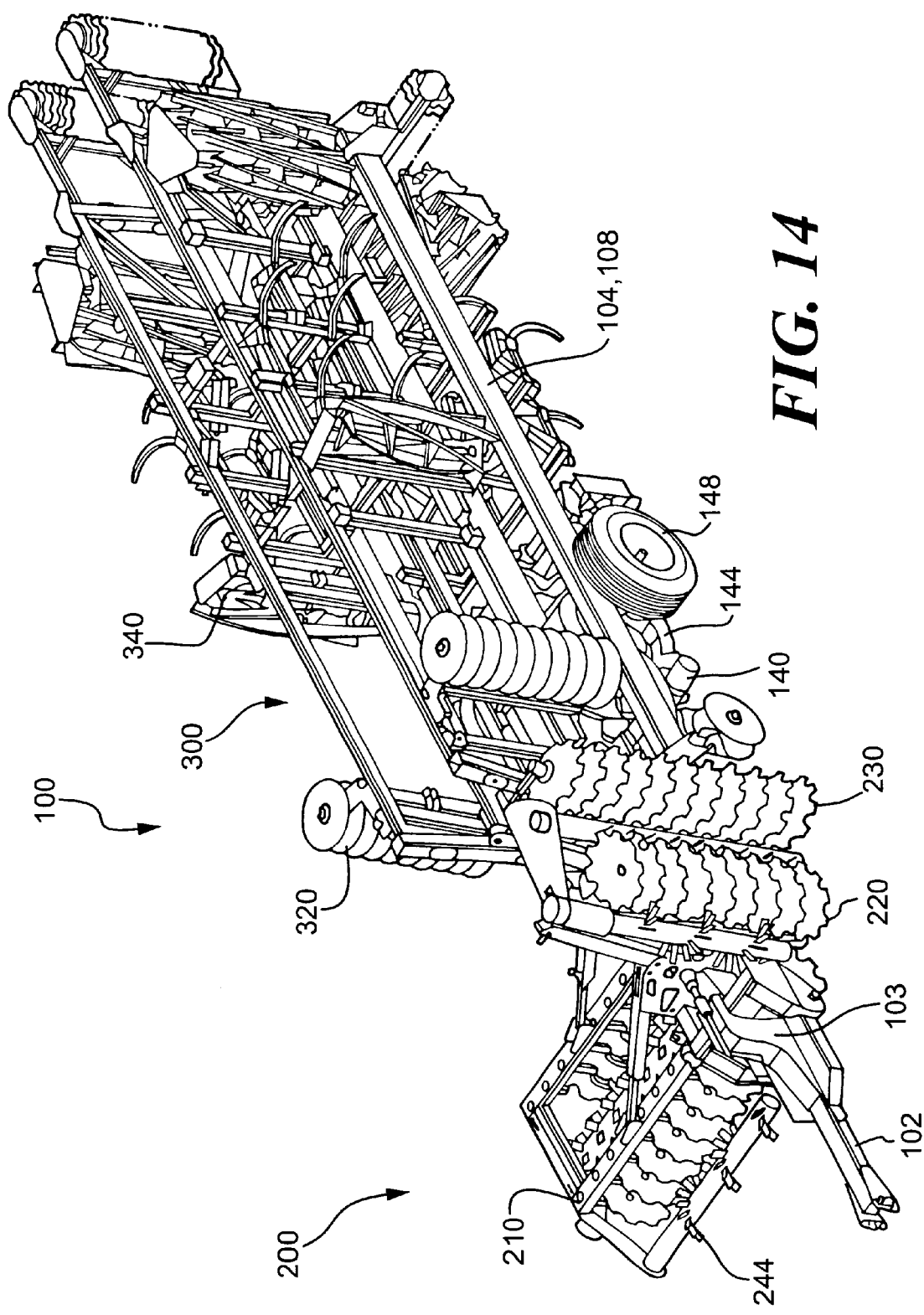
FIG. 14 is an isometric view of the farm implement of FIG. 1, depicting one of the front frame wings and both of the rear frame wings of the farm implement in a folded (raised) position.

The front frame wings 202 may be raised from their operative (lowered) position, which is substantially parallel to the ground or horizontal, to an angle of at least 45 degrees, more preferably at least 90 degrees, as shown in FIGS. 14–16. (By way of variation, the implement 100 of FIG. 14 illustrates a helical pattern of teeth as the members 244.) Pivot brackets 280 are mounted at the proximal end portions of the lateral wing beams 204. Pivot pins 281 pivotally connect the pivot brackets 280 to respective apertures (114a in FIG. 5) of the front folding frame brackets 114, which in FIGS. 15 and 16 are shown in phantom views. Primary mounting bases 282 are also mounted with appropriate fasteners, quick-release parts, welding or the like to proximal end portions of the lateral wing beams 204. Secondary mounting bases 284 are fixed to the lateral wing beams 204 at a position closer to the distal end portion of the lateral wing beams 204 than the primary mounting bases 282.

Coupler arms 286 each have a first end connected pivotally to one of the front folding frame brackets 114 at respective apertures (114b in FIG. 5), and a second end connected pivotally to one of the secondary mounting bases 284. The coupler arms 286 are articulated at position 286a. Hydraulic cylinders 288 each have a first end connected pivotally to the primary mounting base 282 at 287 and a second end connected pivotally to the coupler arm 286 at 289. (For convenience sake, only one of the coupler arms 286, hydraulic cylinders 288, and front folding frame brackets 114 are shown in FIGS. 15 and 16.) The hydraulic cylinders 288 may be replaced with pneumatic or other equivalently functioning devices. When the hydraulic cylinder 288 is depressurized, the second end of the coupler arm 286 is lowered to orient the front frame wing 202 substantially horizontally. Pressurizing the hydraulic cylinder 288 to an extended position presses the primary mounting base 282 downward. Simultaneously, pressurization of the hydraulic cylinder 288 pushing up on the coupler arm 286 while preventing buckling of the coupler arm 286 at articulated joint 286a. The downward load applied by the hydraulic cylinder at the primary mounting base 282, together with pulling force applied to the secondary mounting base 284 by the rising coupler arm 286, serve to pivot the front frame wing 202 into its folded (or raised) position.

In the folded position, the aperture 280a of the pivot bracket 280 may be aligned with the aperture 114c (FIG. 5) of the front folding frame bracket 128. A lock pin (not shown) may be placed through the aligned apertures 114c and 280a to lock the front frame wing 202 in its folded position.

As mentioned above, the rear folding frame assembly 300 comprises left and right rear frame wings 302. The left and right rear frame wings 302 are located on opposite sides of the central frame structure 108. Each of the rear frame wings 302 comprises lateral wing beams (or members) 304 having one end portion pivotally coupled to the central frame structure 108 and the other end portion distal to the central frame structure 108. Outer longitudinal beams 306 connect the lateral wing beams 304 at their distal ends. Inner longitudinal beams 308 connect the lateral wing beams 304, but are positioned between the central frame structure 108 and the outer longitudinal beams 306. Crossbeam rows 310, 312, 314, 315, 316, and 318 extend laterally and discontinuously across the frame 104. Slanted support beams 319 are provided near the back of the rear folding frame assembly 300. The raising and lowering of the rear frame wings 302 will be described in greater detail below.

Positioned to the rear of the mechanism 210 are left and right coulter assemblies 320, each of which is coupled to crossbeam row 310. Referring to FIGS. 17–19, each of the coulter assemblies 320 comprises a coulter shaft 322 with an axis substantially perpendicular to the direction of travel. A plurality of coulter blades (or discs) 324 are annular in shape to snugly fit over the coulter shaft 322. The coulter blades 324 are spaced axially relative to each other along the axis of the coulter shaft 322. Each of the coulter blades 324 has a ground-engaging outer periphery. Although not shown, the peripheries of the coulter blades 324 may have notches extending radially inward, as is known in the art. The coulter blades 324 may also be fluted. Preferably, the coulter blades 324 are planar and are arranged parallel to the direction of travel. In one preferred embodiment, the coulter blades are 46 cm (18 inches) to 66 cm (26 inches) in diameter, more preferably 61 cm (24 inches) in diameter.

The ends of the coulter shaft 322 are rotationally coupled to coulter side weldments 326 by an appropriate bearing arrangement or the like. A coulter cross member 328 extends between the coulter side weldments 326 to maintain the spacing between the side weldments 326 and provide structural support to the coulter assembly 320. The upper portion of the coulter side weldment 326 includes a channel (unnumbered) receiving an end portion of a coulter swing arm 332. Fingers 334 extend over the coulter swing arm 322 to hold it in place, and a coulter lock pin 324 prevents longitudinal movement of the coulter swing arm 332 relative to the channel of the coulter side weldment 326. The other end 332a of the coulter swing arm 332 is pivotally connected to the crossbeam row 310 by a suitable pivot-pin arrangement. Located on top of the coulter cross member 328 is a coulter pivot pin assembly 330. A coulter assembly load-adjusting actuator 336, such as a hydraulic or pneumatic cylinder or other biasing device, has one end coupled to the coulter pivot pin assembly 330. The other end of the coulter assembly load-adjusting actuator 336 is connected to the frame 104, such as inner longitudinal beam 308. The end connections of the coulter assembly load-adjusting actuator 336 are preferably pivot-pin arrangements, which preferably have spherical bearings. (The coulter-assembly load-adjusting actuator 336 has been omitted from FIGS. 17 or 19.)

The floating arrangement by which the coulter assemblies 320 are suspended below the frame 104 with a load-adjusting actuator 336 provides distinct benefits to the farm implement 100 of this invention. For example, the penetration depth of the coulter blades 324 may be adjusted by, for example, pressuring or depressurizing the load-adjusting actuator 336 to apply different loads to the ground for different soil types, and the vary the loads applied by each of the cultivating devices attached to the same frame 104.

With reference to FIGS. 1–3, 20 and 21, the next devices coupled to the frame are chopping and breaking reel assemblies, or "mid-reel" assemblies 340. The reel assemblies 340 are preferably of the type commercially available under the name "DO-ALL" manufactured by Forrest City Machine Works, Inc. of Forrest City, Ark. Each reel assembly 340 has a reel shaft 342 and blades 344 attached to the outer peripheral surface of the reel shaft 342 via attaching members 346. The attaching members 346 are preferably welded to a peripheral surface of the reel shaft 342 and the blades 344 are preferably bolted to the attaching members 346. The blades 344 have ground engaging edges. The blades 344 are pitched or angled with respect to the longitudinal axis of the reel shaft 342 when attached to the attaching members 346. This pitch is caused by circumferentially offsetting adjacent sets of attaching members 346 such that when the blades 344 are attached thereto, the blades 344 are twisted about their longitudinal axis and pitched with respect to the longitudinal axis of the reel shaft 342. Generally, the blades 344 lie along a helical pattern. For example, for a shaft 342 having a width of 1.8 meters (70 inches) and diameter of 56 cm (22 inches), five of the blades 344 may be used, and each of the blades 344 may twist extend around the periphery of the shaft 342 by 108 degrees.

The working of the soil by the soil breaking and loosing mechanisms 210 and the coulter blades 324 allows the reel assemblies 340 to operate at maximum performance to chop stubble or other debris and to break clods while mixing the loosened soil. The reel assemblies 340 perform this action by rotating as the implement 100 is pulled through the soil such that the edges of the blades 344 perform the chopping and breaking function. To enhance this function, the blades 344 may be radially offset (or slanted) forward by an angle of 10 to 12 degrees. In a particularly preferred embodiment, the blades 344 are 8 cm (3 inches) to 15 cm (6 inches) in wide, more preferably 10 cm (4 inches) wide, and 0.64 cm (¼ inch) to 1.3 cm (½ inch), more preferably 0.95 cm (⅜ inch) in thickness.

Figure 20:
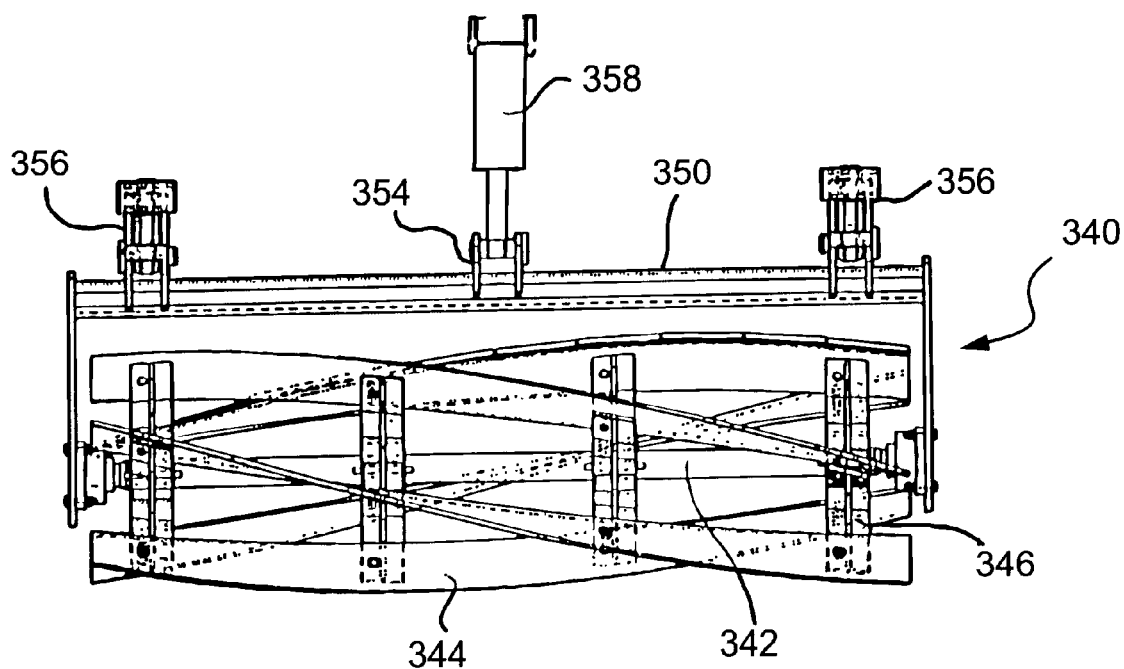
FIG. 20 is a front elevation view of a reel of the farm implement.
Figure 21:
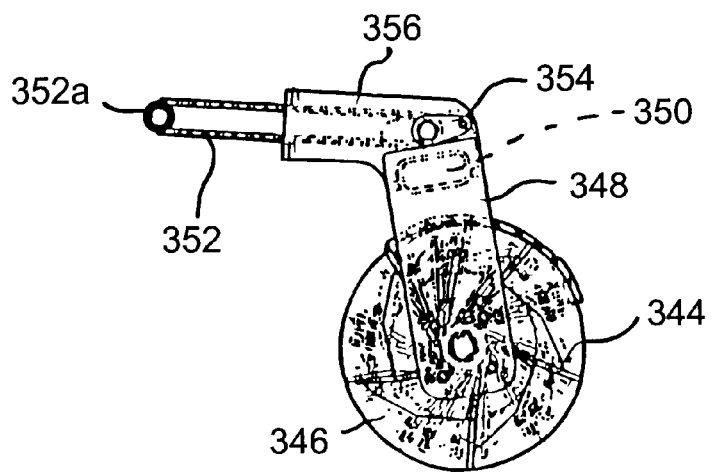
FIG. 21 is a side elevation view of the-reel of FIG. 20.
Figure 22:
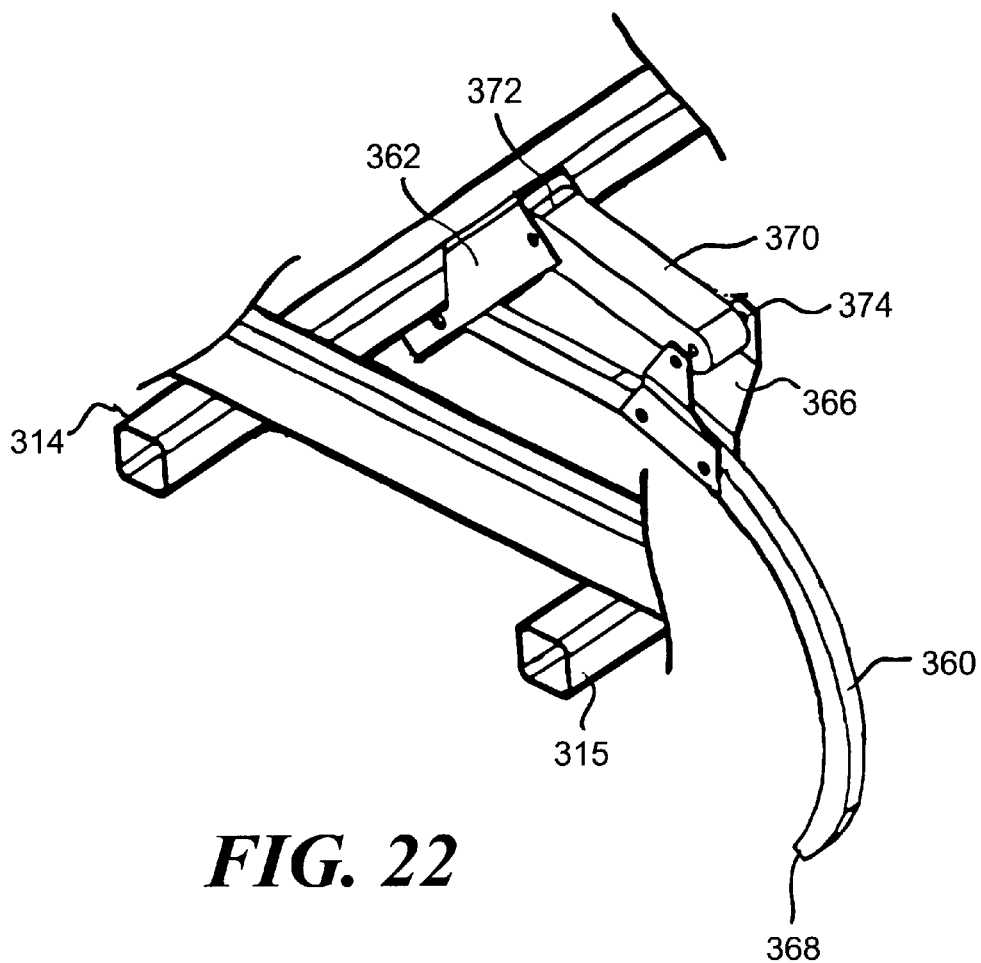
FIG. 22 is an isometric view of a chisel shank of the farm implement.
Figure 23:
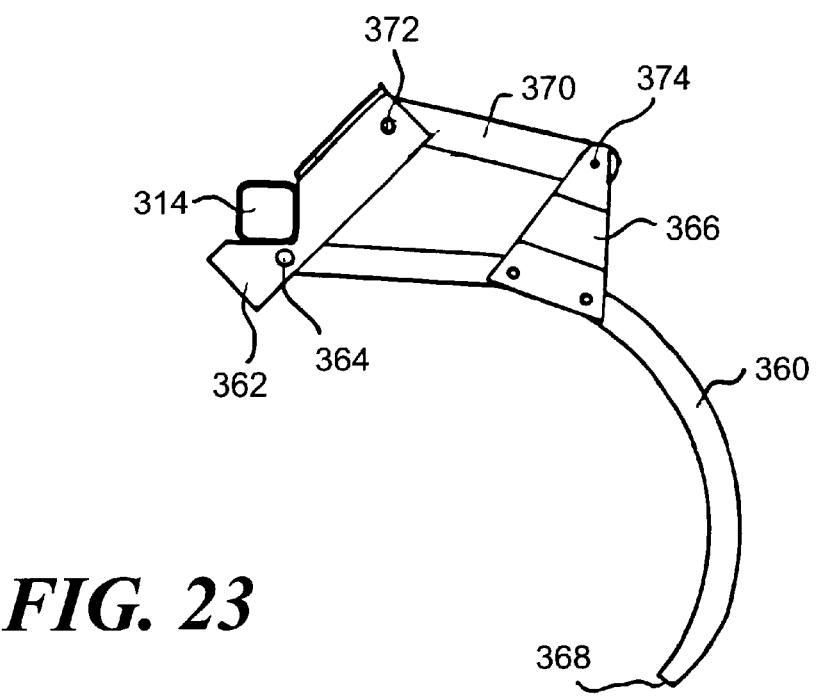
FIG. 23 is a side elevation view of the chisel shank of FIG. 22.

As shown in FIGS. 20 and 21, opposite ends of the reel shaft 342 are rotationally coupled to reel end plates 348 by an appropriate bearing arrangement or the like. A reel cross member 350 extends between the reel end plates 348 to maintain the spacing between the reel end plates 348 and provide structural support to the reel assembly 340. Reel weldments 356 are mounted on the reel cross member 350 and include a channel (unnumbered) receiving an end portion of a reel swing arm 352. Fingers extend over the swing arm 352 to hold it in place, and a lock pin 354 prevents longitudinal movement of the swing arm 352 relative to the channel of the reel weldment 356. The other end 352a of the swing arm 352 is pivotally connected to the crossbeam row 312 by a pivot-pin arrangement or the like. Located on top of the cross member 350 is a reel pivot pin assembly 354. A reel assembly load-adjusting actuator 358, such as a hydraulic or pneumatic cylinder or other biasing or powered device, has one end coupled to the pivot pin assembly 354 and its other end connected to the frame 104, such as inner longitudinal beam 308, by a suitable pivot-pin arrangement. (The reel assembly load-adjusting actuator 358 has been omitted from FIG. 21.) This floating arrangement provides the reel assembly 340 with the same benefits described above in connection with the coulter assembly 320.

With reference to FIGS. 1–3, 22, and 23, chisel shanks (or tines) 360 are attached to crossbeam rows 314, 315, and 316. Each row of shanks 360 is offset in the lateral direction from its adjacent row or rows of shanks 360. Each shank 360 in each row is spaced from adjacent shank. As referred to herein, chisel shanks 360 also mean blades capable of penetrating into the earth, including those having a sweep or tooth (not shown) disposed on its lower end to engage the ground.

The shanks 360 are attached to the crossbeam rows 314, 315, and 316 as follows. Referring to the shank 360 illustrated in FIGS. 22 and 23, a base 362 having an indentation 364 is attached to crossbeam 314 by welding, bolts, or the like. In the illustrated embodiment, the base 362 is arranged at a 45 degree angle relative to the crossbeam 314. A first end of the shank 360 is connected pivotally to the bottom of the base 362 at pin 364. The shank 360 passes through a coupler 366, then curves downward towards the ground before terminating in a second end 368, which may be blunt or pointed, depending upon design choice. One end of a linkage 370 is attached to the upper end of the base 362 at joint 372. The other end of the linkage 370 is attached to the coupler 366 at joint 374. Although not shown, a pre-tension spring force is applied to the top of the coupler 366 by use of a spring or other biasing member. The illustrated chisel shank is commercially available from John Deere and from Belota under Part Numbers 12464 and 12467. Other variations of shanks and other penetrating members, such as the S-shaped tines disclosed in U.S. Pat. No. 5,622,227, may be used herein in place of the chisel shanks. For this reason, the chisel shanks are preferably detachable and reattachable to the frame 104.

With reference to FIGS. 1–3, 24, and 25, basket units 380 will be described. Three basket units 380 are positioned across the rear of the implement 100. Each basket unit 380 has a movable or swingable support structure. The structure has end panels 382 that are connected by a top horizontal beam 384. A tilt-adjustment member 386 is mounted on the horizontal beam 384. The tilt adjustment member 386 has a plurality of apertures generally designated by reference numeral 386a, each of which is capable of receiving a lock pin. The tilt-adjustment member 386 is pivotally coupled to suspension beam 309 by a pivot-pin arrangement 387 and lock pin (not shown) placed through one of the apertures 386a and an aperture (not shown) in the suspension beam 309. The upper end of the suspension beam 309 is pivotally connected to the rear frame wing 302 by a suitable pivot-pin arrangement. The apertures 386a and pivot-pin arrangement may be situated elsewhere. For example, apertures 386a may be placed more toward the forward end of the tilt-adjusting member 386.

Each basket unit 380 has a forward roller 390 with a shaft 392 and a rearward roller 400 with a shaft 402. The shafts 392 and 402 are rotatably supported between the panels 382. Any suitable bearing arrangement may be used to support the shafts 392 and 402 on the panels 382. The shafts 392 and 402 have circular attaching members 394 and 404 disposed at locations along their peripheral surfaces. The attaching members 394 and 404 are used to support blades 396 and 406. The attaching members 394 and 404 are preferably attached to the shafts 392 and 402 by welding and the blades 396 and 406 are preferably attached to the members 394 and 404 by welding, although conventional fasteners may be used. The blades 396 and 406 are pitched or angled with respect to the longitudinal axis of the shafts 392 and 402 when they are connected to the members 394 and 404. That is, the blades 396 and 406 are twisted about their longitudinal axis when attached to the members 394 and 404 such that the blades 396 and 406 are angled or pitched with respect to the shafts 392 and 402, such as along helical paths. For example, for a shaft 392 or 402 having a width of 1.8 meters (70 inches) and a diameter of 40 cm (16 inches), seven of the blades 396 or 406 may be used. The blades 396 or 406 may twist extend around the periphery of the shaft 392 or 402 by, for example, 60 to 90 degrees, more preferably 77 degrees.

Further, the blades 396 and 406 of the rollers 390 and 400 preferably are angled slightly forwardly toward the direction of rotation of the rollers 390 and 400, for example, by 10 to 12 degrees. In a particularly preferred embodiment, the blades 396 and 406 are 5.1 cm (2 inches) to 10.2 cm (4 inches wide), more preferably 7.6 cm (3 inches) wide, and 0.63 cm (¼ inch) to 1.3 cm (½ inch), more preferably 0.95 cm (⅜ inch) in thickness.

Each of the basket units 380 has an adjusting arrangement for adjusting the amount of force that the rollers 390 and 400 apply to the soil. Each adjusting arrangement comprises a basket unit load-adjusting actuator, such as a hydraulic or pneumatic cylinder or the like. The basket unit load-adjusting actuator is, connected at its lower end to a connecting flange 386 on one of the horizontal beams 384 by a suitable pivot-pin arrangement. The upper end of the basket unit load-adjusting actuator is likewise attached by a suitable pivot-pin arrangement to the frame 104, such as the inner longitudinal beam 308 or beam 319. Thus, as the load-adjusting actuator is pressurized, the rollers 390 and 400 are lowered towards the soil. As is apparent, the cylinders can be used to apply variable pressure to the soil through the rollers 390 and 400 and to thus obtain the desired soil condition of a seedbed.

In the event that the load-adjusting actuators described above are hydraulic cylinders, the cylinders can be hooked up to the hydraulic system of the tractor and can thus be adjusted by the machine operator even when the implement is being pulled through the soil. By individually controlling the respective loads of the various components of the implement 100, the operator can distribute weight evenly throughout the cultivating devices of the implement 100 to minimize compaction and attain desired tillage effects.

Figure 24:
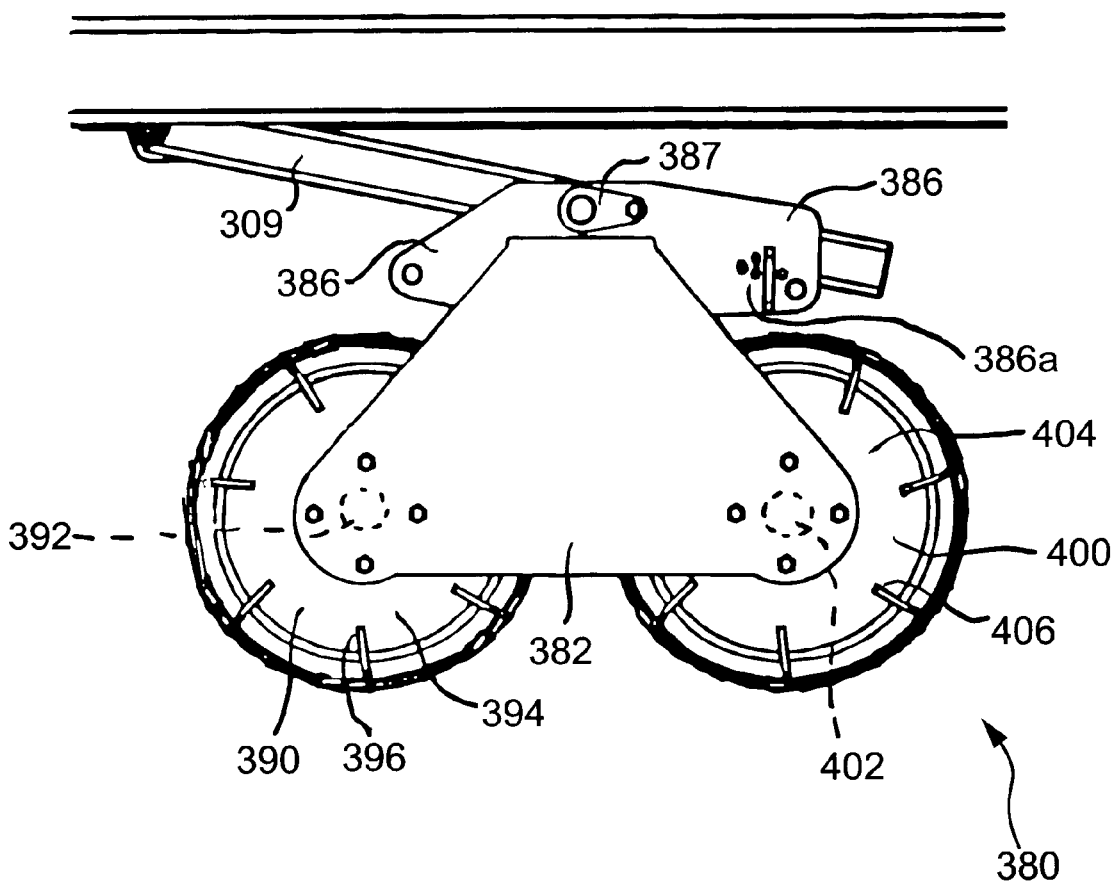
FIG. 24 is a side elevation view of a basket unit.
Figure 25:
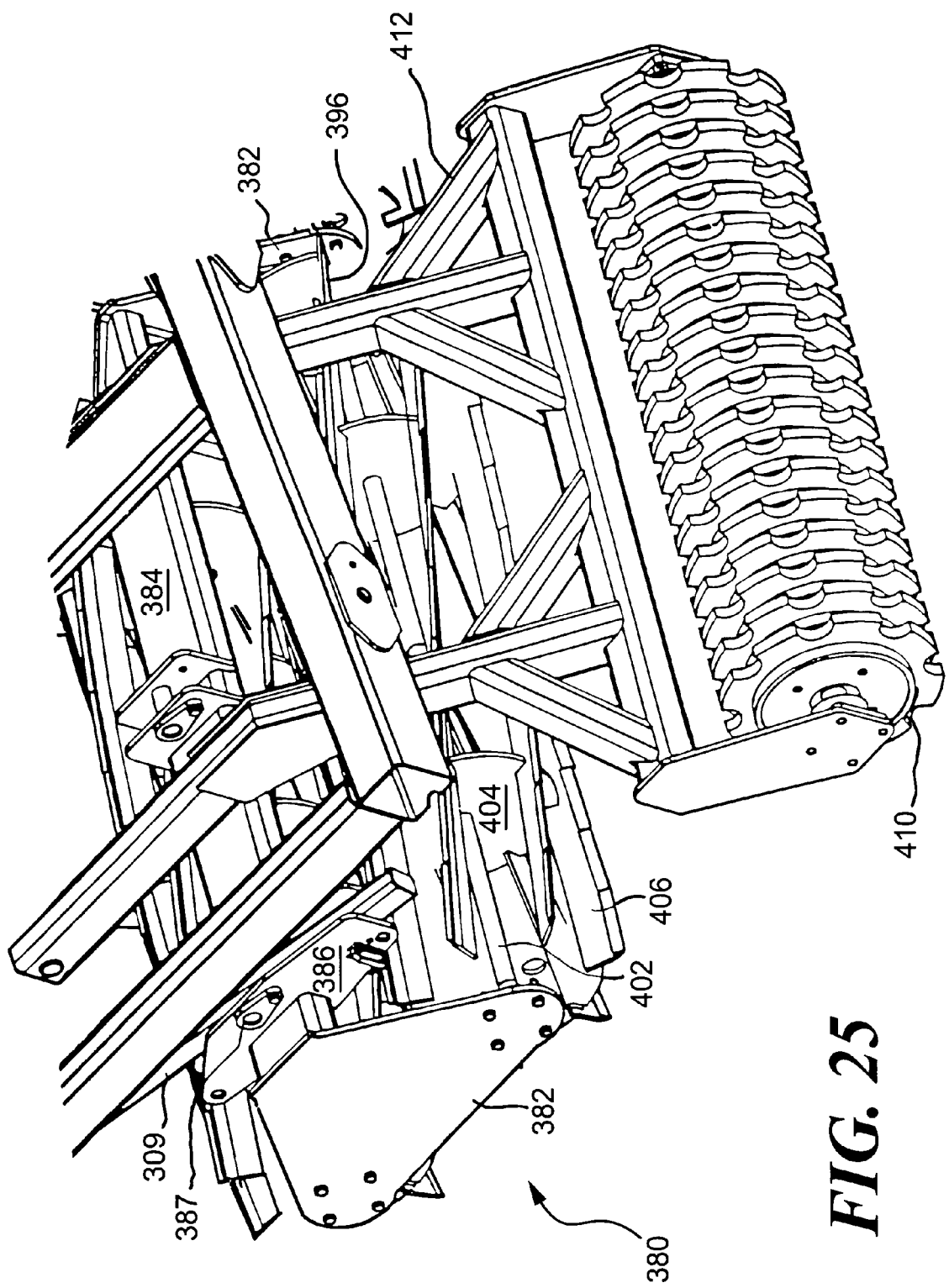
FIG. 25 is a rear isometric view of the basket unit of FIG. 24.

Further, with reference to FIGS. 24 and 25, each basket unit 380 can have a tilt adjusting capability. In particular, to adjust the tilt of the basket unit 380, the pivot-pin arrangement 387 is unlocked and the basket unit 380 is tilted to its desired position to align the aperture (not shown) of the suspension beam 309 with a corresponding one of the apertures 386a. The pivot-pin arrangement 387 is then locked, and a lock pin is placed through the appropriate aperture 386a and the suspension beam aperture. Adjusting the tilt of the basket units 380 allows the implement operator to adjust the flow of soil through the basket units 380. For example, tilting the basket units 380 forward causes the front roller 390 to carry (accumulate) soil, which may be pushed into holes in the seed bed. Forward tilting of the basket units 380 also effectively cuts through and moves high spots in the seedbed, further promoting a level seedbed.

With reference to FIGS. 1–3 and 25, finishing rollers 410 can be located behind the rear roller 400 of the basket unit 380. Support frames 412 rotatably supports the finishing rollers 410. Each of the support frames 402 extends from and is connected to the rearwardmost of beams of the frame 104. The finishing rollers 410 may be solid rollers or floating rings, optionally having notches disposed circumferentially along its peripheral surface and extending radially inward. The finishing rollers 410 serve to further break down any remaining dirt clods and serves to seal moisture into the ground.

The rear frame wings 302 may be raised from their operative position, which is substantially parallel to the ground or horizontal, to a folded position at an angle of at least 45 degrees, more preferably at least 90 degrees, as shown in FIG. 14.

Figure 26:
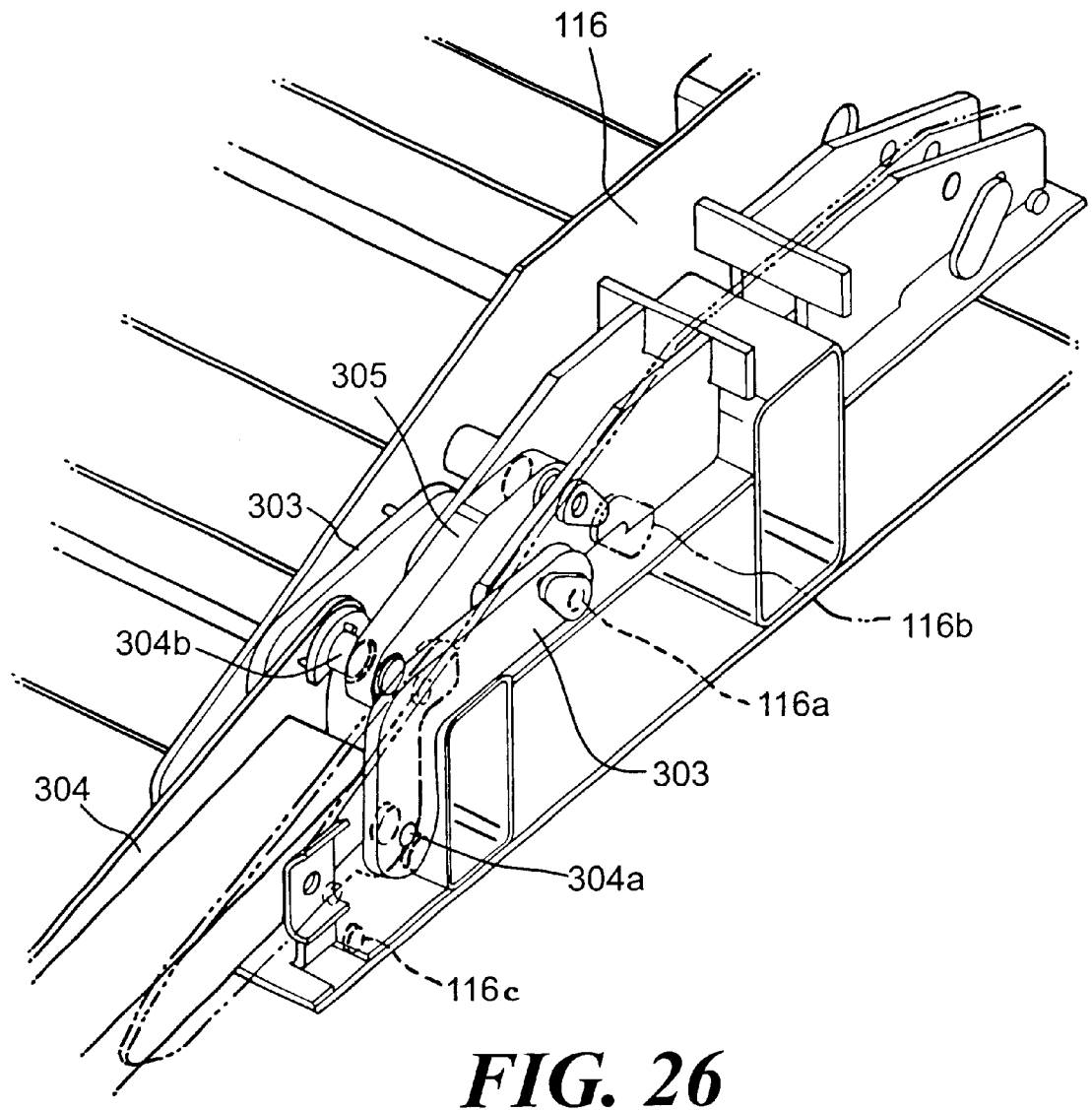
FIG. 26 is an isometric fragmentary view of a rear frame wing in a deployed position.

Referring now more particularly to FIG. 26, the rear folding frame assembly 300 preferably comprises a four-bar folding mechanism that is mounted on rear folding frame brackets 116 (FIG. 5), the rear wall of which is shown in phantom view in FIG. 26. Two lower links 303 have an inverted L-shape and are pivotally mounted with apertures 116a (FIG. 5) of the rear folding frame bracket 116. An upper link 305 is also pivotally mounted at one of its ends to the rear folding frame bracket 116 at apertures 116b (FIG. 5). The opposite ends of the lower link 303 and the upper link 305 are pivotally connected to one of the lateral wing beams 304 at points 304a and 304b, respectively. Part of the rear wall of the lateral wing beam 304 is shown in phantom view in FIG. 26. One end of a hydraulic cylinder (not shown) is pivotally mounted to the rear folding frame bracket 116 at apertures 116c, and the other end of the hydraulic cylinder is pivotally mounted to the lateral wing beam 304. When depressurized, the hydraulic cylinder is in a compact state, so that the rear wing structure 302 is oriented horizontally. Pressurization of the hydraulic cylinder 307 causes the four-bar link system to perform a rotational and linear transfer of the lateral wing beam 304, causing the rear wing structure 302 to rise at least 45 degrees, preferably at least 90 degrees, into a folded position, shown in FIG. 14.

One possible mode of operation of the implement 100 will be described. It is to be understood, however, that the mode of operation described below is not exhaustive of the scope of this invention. Many variations and modifications fall within the scope of the invention.

The implement 100 is first connected to a tractor or other pulling mechanism by the hitch portion 102 and the appropriate hydraulic hookups are made to the tractor. The implement is then lowered into the soil using the cylinders 154 as described above. The depth to which the implement engages the soil can be adjusted by stops in cylinders 154. As the implement is pulled through the soil, the disc/drive unit 210 is the first device on the implement to engage compacted soil. The unit 210 serves to break and loosen the compacted soil as follows. During movement of the farm implement 100 across the ground along the direction of travel, the teeth 244 of the ground-engaging driver 240 engage and penetrate the ground to break up the compacted soil. Simultaneously, the driver shaft 242 is rotated, which actuates the accelerator unit 260 to rotate the driven shaft 252 at an accelerated rate. The row of first discs 220 then penetrates and inverts the soil, while also displacing the soil laterally. The driven flow controller 250, functioning at an accelerated speed, controls soil flow by having the paddles sweep and redirecting the soil along a substantially longitudinal path along which the elongated members 254 travel. The driven flow controller 250 thereby impedes excess lateral movement of the soil inverted and displaced by the row of first discs 220 so as to. The second row of discs 230 then inverts the soil again and returns the soil toward its original lateral location.

After compacted soil has been loosened and broken by unit 210, the coulter assembly 320 penetrates deeper into the ground with its sharp edges and breaks up large clumps of soil loosened by unit 210. The reel assembly 340 next passes over the soil to chop debris and breaking soil clods.

The rows of chisel shanks 360 then penetrate deeper into the loosened soil to blend and mix the soil, leaving furrows and bringing clods and stubble to the surface. Further, because the soil has been conditioned by the disc/drive unit 210, the coulter assembly 320, and the reel assembly 340, the rows of the chisel shanks 360 are allowed to operate at maximum performance to further mix and incorporate debris into the seedbed. The arrangement of the rows of chisel shanks or tines 360 ensures that the soil passed over by the implement is adequately mixed and conditioned by the chisel shanks or tines 360.

The additional soil loosened by the chisel shanks 360 serves to load front basket unit 380. The front rollers 390 serve to mix, blend and condition the seedbed, while propelling dirt upwardly and rearwardly to load the rear rollers 400 to thus maximize the performance of the rear rollers 390. The rear rollers 400 serve to further blend and mix the soil and to ensure that any debris is incorporated into the seedbed. Further, the load-adjusting actuator and the tilt adjustment arrangement can adjust the force with which the rollers 390 and 400 engage the soil to form a loose or firm seedbed.

The finishing roller 410 is the last device on the implement and serves to break down any remaining clods, smooth the soil, and seal in moisture.

Thus, the farm implement 100 in a single pass takes compacted soil and transforms it into a smooth seedbed of consistent depth without waves or ruts. More particularly, because a single frame 104 supports the cultivating devices described above, the seedbed will have a consistent depth. The various load-adjustment actuators may be used to facilitate this object by causing the cultivating devices to apply variable forces to the ground. This arrangement allows for enhanced performance in preparing seedbeds having depths, for example, of 10.2 cm (4 inches) to 31 cm (12 inches). Thus, the problems associated with multiple passes with multiple different implements resulting in inconsistent depth and conditions of a seedbed may be eliminated.

Placement of the cultivating devices in the order described above is believed to optimize the operation of the devices. However, it is within the scope of this invention to change the order of the cultivating devices from that shown, to add additional cultivating devices to the frame, and/or to omit one or more of the cultivating devices shown. Also, it should be understood that the folding feature of the illustrated farm implement 100 is optional. The pivotal connections of the frame wings 202 and 302 to the central frame structure 108 may be substituted with more conventional welding or fasteners. In this regard, instead of segmenting the cultivating devices (e.g., disc/drive unit 210, coulter assembly 320, reel assembly 340, and rear basket unit 380) as illustrated for facilitating folding, these and other cultivating devices may extend across most or all of the width of the implement 104.

The various examples of dimensions given above are by way of illustration, and are not exhaustive of the scope of the invention. Variations in dimensions to fit the intended us of the implement 100 is well within the purview of those having ordinary skill in the art.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A farm implement movable across ground along a direction of travel for tillage of the ground, the farm implement comprising:

a frame; and a disc/drive unit comprising a plurality of first discs coupled to the frame, each of the first discs having a ground-engaging outer periphery, the outer peripheries of the first discs defining respective first planes angled acutely relative to the direction of travel, a plurality of second discs coupled to the frame and arranged behind the first discs along the direction of travel, each of the second discs having a ground-engaging outer periphery, the outer peripheries of the second discs defining respective second planes angled acutely relative to the direction of travel, the second planes being angled to an opposite side of the direction of travel than the first planes, a ground-engaging driver rotatably coupled to the frame for rotating as the driver engages and is moved across the ground along the direction of travel, and a driven flow controller rotatably coupled to the frame for rotating at a rotational speed and situated between the plurality of first discs and the plurality of second discs, the driven flow controller having sweeping members rotatable in a forward direction, the ground-engaging driver operatively engaged with the driven flow controller for controlling the rotational speed of the driven flow controller.

2. The farm implement of claim 1, wherein:

the ground-engaging outer peripheries of the first discs each comprise notches extending substantially radially inward relative to the first discs and spaced circumferentially relative to each other; and the ground-engaging peripheries of the second discs each comprise notches extending substantially radially inward relative to the second discs and spaced circumferentially relative to each other.

3. The farm implement of claim 1, wherein the first discs are arranged in a first row substantially perpendicular to the direction of travel and the second discs are arranged in a second row substantially perpendicular to the direction of travel.

4. The farm implement of claim 1, wherein the first planes and the second planes are offset relative to the direction of travel by 10 degrees to 20 degrees.

5. The farm implement of claim 1, wherein the first planes and second planes are offset relative to the direction of travel by 15 degrees.

6. The farm implement of claim 1, wherein the first planes and second planes are tilted back to offset the first and second planes from vertical by an angle of 2 degrees to 10 degrees.

7. The farm implement of claim 1, wherein the first planes and second planes are tilted back to offset the first and second planes from vertical by an angle of 6 degrees.

8. The farm implement of claim 1, wherein each of the first discs and each of the second discs have a respective concave face exposed to the direction of travel.

9. The farm implement of claim 1, wherein the ground-engaging driver is supported ahead of the plurality of first discs relative to the direction of travel.

10. The farm implement of claim 1, wherein the ground-engaging driver comprises a shaft and a plurality of sets of elongated members extending from the shaft, the shaft having an axial length and a peripheral surface, the plurality of sets of elongated members being spaced at respective axial locations along the axial length, each of the sets of elongated members comprising a plurality of the elongated members spaced apart circumferentially about the peripheral surface of the shaft.

11. The farm implement of claim 10, wherein the elongated members comprise elongated twisted teeth.

12. The farm implement of claim 10, wherein each of the elongated members is tilted forward from a respective radial position relative to the shaft.

13. The farm implement of claim 1, wherein:

the ground-engaging driver is supported ahead of the plurality of first discs relative to the direction of travel;

the ground-engaging driver comprises a shaft and a plurality of sets of elongated twisted teeth extending from the shaft, the shaft having an axial length and a peripheral surface, the plurality of sets of elongated twisted teeth being spaced at respective axial locations along the axial length, each of the sets of elongated twisted teeth comprising a plurality of the elongated twisted teeth spaced apart circumferentially about the peripheral surface of the shaft; and the elongated twisted teeth have respective ends distal to the shaft for rotating along respective paths, the paths each extending into a space between a corresponding set of adjacent ones of the first discs.

14. The farm implement of claim 1, wherein the driven flow controller comprises a shaft and a plurality of sets of the sweeping members extending from the shaft, the shaft having an axial length and a peripheral surface, the plurality of sets of sweeping members being spaced at respective axial locations along the axial length, each of the sets of sweeping members comprising a plurality of the sweeping members spaced apart circumferentially about the peripheral surface of the shaft.

15. The farm implement of claim 14, wherein the sweeping members comprise elongated paddles.

16. The farm implement of claim 15, wherein the elongated paddles have respective ends distal to the shaft for rotating along respective paths, the paths each extending into a first space between a corresponding set of adjacent ones of the first discs and a second space between a corresponding set of adjacent ones of the second discs.

17. The farm implement of claim 1, wherein the farm implement further comprises an accelerator unit for rotating the driven flow controller at a ratio of about 3:1 to about 3.5:1 relative to the ground-engaging driver.

18. The farm implement of claim 1, further comprising a coulter assembly coupled to the frame, the coulter assembly comprising a rotatable coulter shaft situated behind the plurality of second discs along the direction of travel, the coulter shaft having an axis substantially perpendicular to the direction of travel, the coulter assembly further comprising a plurality of coulter blades spaced axially relative to each other along the axis of the coulter shaft, each of the coulter blades having a ground-engaging outer periphery, the outer peripheries of the coulter blades defining respective third planes parallel to the direction of travel.

19. The farm implement of claim 1, wherein the coulter assembly further comprises a coulter assembly load-adjusting actuator for controlling the load that the ground-engaging outer peripheries of the coulter blades apply to the ground.

20. The farm implement of claim 19, wherein the coulter assembly further comprises a pivotal coulter link connecting to the frame for suspending the coulter assembly from the frame.

21. The farm implement of claim 1, further comprising a reel assembly coupled to the frame, the reel assembly comprising a rotatable reel shaft and a plurality of elongated blades, the reel shaft having a periphery and being situated behind the plurality of second discs along the direction of travel, the elongated blades being spaced circumferentially about the periphery of the reel shaft along a helical pattern and having a ground-engaging edge for chopping debris and breaking soil clods.

22. The farm implement of claim 21, wherein the reel assembly further comprises a reel assembly load-adjusting actuator for controlling the load that the ground-engaging edges of the elongated blades apply to the ground.

23. The farm implement of claim 21, wherein the reel assembly further comprises a pivotal reel link connecting to the frame for suspending the reel assembly from the frame.

24. The farm implement of claim 1, further comprising a plurality of rows of at least one member selected from the group consisting of chisel shanks and tines supported by the frame, the rows disposed behind the plurality of second discs along the direction of travel, each of at least one member having an edge portion distal to the frame for engaging the ground.

25. The farm implement of claim 24, wherein each of the rows has a respective plurality of said at least one member arranged in staggered relationship relative to said at least one members of adjacent rows.

26. The farm implement of claim 24, wherein said at least one member is detachable from and reattachable to the frame.

27. The farm implement of claim 1, further comprising a basket unit coupled to the frame and situated behind the plurality of second discs along the direction of travel, the basket unit comprising:
   a forward roller rotatably supported by the frame, the forward roller comprising a forward shaft having a periphery and plurality of longitudinal blades, the longitudinal blades being spaced circumferentially about the periphery of the forward shaft along respective helical patterns and each having a respective ground-engaging edge for mixing and blending soil with a rolling action; and
   a rear roller rotatably supported by the frames the rear roller comprising a rear shaft having a periphery and plurality of longitudinal blades, the longitudinal blades being spaced circumferentially about the periphery of the rear shaft along helical patterns and each having. a respective ground-engaging edge for mixing and blending soil with a rolling action.

28. The farm implement of claim 27, wherein the basket unit further comprises a roller unit load-adjusting actuator for controlling the load that the ground-engaging edges of the longitudinal blades apply to the ground.

29. The farm implement of claim 1, further comprising a finishing roller supported at a rear portion of the frame along the direction of travel.

30. A farm implement movable across ground along a direction of travel for tillage of the ground, the farm implement comprising:
   a frame;
   a disc/drive unit comprising:
      a plurality of first discs coupled to the frame, each of the first discs having a ground-engaging outer periphery, the outer peripheries of the first discs defining respective first planes angled acutely relative to the direction of travel;
      a plurality of second discs coupled to the frame and arranged behind the first discs along the direction of travel, each of the second discs having a ground-engaging outer periphery, the outer peripheries of the second discs defining respective second planes angled acutely relative to the direction of travel, the second planes being angled to an opposite side of the direction of travel than the first planes;
      a ground-engaging driver rotatably coupled to the frame for rotating as the driver engages and is moved across the ground along the direction of travel; and
      a driven flow controller rotatably coupled to the frame for rotating at a rotational speed and situated between the plurality of first discs and the plurality of second discs, the driven flow controller having sweeping members rotatable in a forward direction, the ground-engaging driver operatively connected to the driven flow controller for controlling the rotational speed of the driven flow controller;
   a coulter assembly coupled to the frame, the coulter assembly comprising a rotatable coulter shaft situated behind the plurality of second discs along the direction of travel, the coulter shaft having an axis substantially perpendicular to the direction of travel, the coulter assembly further comprising a plurality of coulter blades spaced axially relative to each other along the axis of the coulter shaft, each of the coulter blades having a ground-engaging outer periphery, the outer peripheries of the coulter blades defining respective third planes parallel to the direction of travel;
   a reel assembly coupled to the frame, the reel assembly comprising a rotatable reel shaft and a plurality of elongated blades, the reel shaft having a periphery and being situated behind the plurality of second discs along the direction of travel, the elongated blades being spaced circumferentially about the periphery of the reel shaft along a helical pattern and having a ground-engaging edge for chopping debris and breaking soil clods; and
   a plurality of rows of at least one member selected from the group consisting of chisel shanks and tines supported by the frame, the rows disposed behind the plurality of second discs along the direction of travel, each of said at least one member having an edge portion distal to the frame for engaging and penetrating the ground.

31. The farm implement of claim 30, wherein the frame supports, in sequence along the direction of travel, the disc/drive unit, the coulter assembly, the reel assembly, and the plurality of rows of chisel shanks or tines.

32. The farm implement of claim 30, wherein the coulter assembly further comprises:
   a pivotal coulter link connecting to the frame for suspending the coulter assembly from the frame; and
   a coulter assembly load-adjusting actuator for controlling the load that the ground-engaging outer peripheries of the coulter blades apply to the ground.

33. The farm implement of claim 30, wherein the reel assembly further comprises:
   a pivotal reel link connecting to the frame for suspending the reel assembly from the frame; and
   a reel assembly load-adjusting actuator for controlling the load that the ground-engaging edges of the elongated blades apply to the ground.

34. The farm implement of claim 30, further comprising a basket unit coupled to the frame and situated behind the plurality of second discs along the direction of travel, the basket unit comprising:
   a forward roller rotatably supported by the frame, the forward roller comprising a forward shaft having a periphery and plurality of longitudinal blades, the longitudinal blades being spaced circumferentially about the periphery of the forward shaft along respective helical patterns and each having a respective ground-engaging edge for mixing and blending soil with a rolling action; and
   a rear roller rotatably supported by the frame, the rear roller comprising a rear shaft having a periphery and plurality of longitudinal blades, the longitudinal blades being spaced circumferentially about the periphery of the rear shaft along helical patterns and each having a respective ground-engaging edge for mixing and blending soil with a rolling action.

35. The farm implement of claim 34, wherein the basket unit further comprises a basket unit load-adjusting actuator for controlling the load that the ground-engaging edges of the longitudinal blades apply to the ground.

36. A farm implement movable across ground along a direction of travel for tillage of the ground, the farm implement comprising:

a frame;

a soil breaking and loosening mechanism;

a coulter assembly coupled to the frame, the coulter assembly comprising a rotatable coulter shaft situated behind the soil breaking and loosening mechanism along the direction of travel, the coulter shaft having an axis substantially perpendicular to the direction of travel, the coulter assembly further comprising a plurality of coulter blades spaced axially relative to each other along the axis of the coulter shaft, each of the coulter blades having a ground-engaging outer periphery, the outer peripheries of the coulter blades defining respective planes parallel to the direction of travel;

a reel assembly coupled to the frame, the reel assembly comprising a rotatable reel shaft and a plurality of elongated blades, the reel shaft having a periphery and being situated behind the soil breaking and loosening mechanism along the direction of travel, the longitudinal blades being spaced circumferentially about the periphery of the reel shaft along a helical pattern and having a ground-engaging edge for chopping debris and breaking soil clods; and a plurality of rows of at least one member selected from the group consisting of chisel shanks and tines supported by the frame, the rows disposed behind the soil breaking and loosening mechanism along the direction of travel, each of said at least one member having an edge portion distal to the frame for engaging the ground, wherein the coulter assembly further comprises a pivotal coulter link connecting to the frame for suspending the coulter assembly from the frame; and a coulter assembly load-adjusting actuator for controlling the load that the groundengaging outer peripheries of the coulter blades apply to the ground.

37. The farm implement of claim 36, wherein the frame supports, in sequence along the direction of travel, the soil breaking and loosening mechanism, the coulter assembly, the reel assembly, and the plurality of rows of chisel shanks or tines.

38. A farm implement movable across ground along a direction of travel for tillage of the ground, the farm implement comprising:

a frame;

a soil breaking and loosening mechanism;

a coulter assembly coupled to the frame, the coulter assembly comprising a rotatable coulter shaft situated behind the soil breaking and loosening mechanism along the direction of travel, the coulter shaft having an axis substantially perpendicular to the direction of travel, the coulter assembly further comprising a plurality of coulter blades spaced axially relative to each other along the axis of the coulter shaft, each of the coulter blades having a ground-engaging outer periphery, the outer peripheries of the coulter blades defining respective planes parallel to the direction of travel;

a reel assembly coupled to the frame, the reel assembly comprising a rotatable reel shaft and a plurality of elongated blades, the reel shaft having a periphery and being situated behind the soil breaking and loosening mechanism along the direction of travel, the longitudinal blades being spaced circumferentially about the periphery of the reel shaft along a helical pattern and having a ground-engaging edge for chopping debris and breaking soil clods; and a plurality of rows of at least one member selected from the group consisting of chisel shanks and tines supported by the frame, the rows disposed behind the soil breaking and loosening mechanism along the direction of travel, each of said at least one member having an edge portion distal to the frame for engaging the ground, wherein the reel assembly further comprises a pivotal reel link connecting to the frame for suspending the reel assembly from the frame; and a reel assembly load-adjusting actuator for controlling the load that the ground-engaging edges of the longitudinal blades apply the ground.

39. A farm implement movable across ground along a direction of travel for tillage of the ground, the farm implement comprising:

a frame;

a soil breaking and loosening mechanism;

a coulter assembly coupled to the frame, the coulter assembly comprising a rotatable coulter shaft situated behind the soil breaking and loosening mechanism along the direction of travel, the coulter shaft having an axis substantially perpendicular to the direction of travel, the coulter assembly further comprising a plurality of coulter blades spaced axially relative to each other along the axis of the coulter shaft, each of the coulter blades having a ground-engaging outer periphery, the outer peripheries of the coulter blades defining respective planes parallel to the direction of travel;

a reel assembly coupled to the frame, the reel assembly comprising a rotatable reel shaft and a plurality of elongated blades, the reel shaft having a periphery and being situated behind the soil breaking and loosening mechanism along the direction of travel, the longitudinal blades being spaced circumferentially about the periphery of the reel shaft along a helical pattern and having a ground-engaging edge for chopping debris and breaking soil clods;

a plurality of rows of at least one member selected from the group consisting of chisel shanks and tines supported by the frame, the rows disposed behind the soil breaking and loosening mechanism along the direction of travel, each of said at least one member having an edge portion distal to the frame for engaging the ground; and a basket unit coupled to the frame and situated behind the plurality of second discs along the direction of travel, the basket unit comprising a forward roller rotatably supported by the frame, the forward roller comprising a forward shaft having a periphery and plurality of longitudinal blades, the longitudinal blades being spaced circumferentially about the periphery of the forward shaft along respective helical patterns and each having a respective ground-engaging edge for mixing and blending soil with a rolling action; and a rear roller rotatably supported by the frame, the rear roller comprising a rear shaft having a periphery and plurality of longitudinal blades, the longitudinal blades being spaced circumferentially about the periphery of the rear shaft along helical patterns and each having a respective ground-engaging edge for mixing and blending soil with a rolling action; and a basket unit load-adjusting actuator for controlling the load that the ground-engaging edges of the longitudinal blades apply to the ground.

* * * * *

UNITED STATES PATENT AND TRADEMARK OFFICE
CERTIFICATE OF CORRECTION

PATENT NO. : 6,554,078 B1
DATED : April 29, 2003
INVENTOR(S) : Kevin G. McDonald It is certified that error appears in the above-identified patent and that said Letters Patent is hereby corrected as shown below:

Column 21,
Line 23, change "frames" to -- frame, --.
Line 27, change "having." to -- having --.

Column 23,
Line 34, change "groundengaging" to -- ground-engaging --.

Signed and Sealed this

Seventh Day of October, 2003

JAMES E. ROGAN
*Director of the United States Patent and Trademark Office*